US010956709B1

(12) United States Patent
Frydman et al.

(10) Patent No.: US 10,956,709 B1
(45) Date of Patent: Mar. 23, 2021

(54) ANTI-SPOOFING DEVICES AND METHODS INVOLVING ACOUSTIC SHEAR WAVES

(71) Applicant: QUALCOMM Incorporated, San Diego, CA (US)

(72) Inventors: Javier Frydman, Tel-Mond (IL); Lior Maor, Petah Tikva (IL); Gal Rotem, Hod Hasharon (IL); Changting Xu, Santa Clara, CA (US); Jessica Liu Strohmann, Cupertino, CA (US); Soon Joon Yoon, San Jose, CA (US); Hrishikesh Vijaykumar Panchawagh, Cupertino, CA (US); Kostadin Dimitrov Djordjev, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/682,896

(22) Filed: Nov. 13, 2019

(51) Int. Cl.
*G06K 9/00* (2006.01)

(52) U.S. Cl.
CPC ......... *G06K 9/0012* (2013.01); *G06K 9/0002* (2013.01)

(58) Field of Classification Search
CPC ............... G06K 9/0002; G06K 9/0004; G06K 9/00087; G06K 9/0012; G06K 9/00053; G06K 9/00067; G06K 9/00046; G06K 9/0008; G06K 2009/00932; G06K 9/00026
See application file for complete search history.

(56) References Cited

U.S. PATENT DOCUMENTS

| 2017/0090024 A1* | 3/2017 | Kitchens, II | A61B 8/0858 |
| 2017/0231534 A1* | 8/2017 | Agassy | G06K 9/0002 382/124 |
| 2018/0018495 A1* | 1/2018 | Hung | G06K 9/00114 |
| 2018/0129849 A1* | 5/2018 | Strohmann | G06K 9/2018 |
| 2019/0212821 A1* | 7/2019 | Keller | G06F 3/016 |

* cited by examiner

*Primary Examiner* — Premal R Patel
(74) *Attorney, Agent, or Firm* — Weaver Austin Villeneuve & Sampson LLP

(57) ABSTRACT

A method of controlling an apparatus that includes an ultrasonic sensor system may involve controlling the ultrasonic sensor system to transmit a first ultrasonic compressional wave and receiving first signals from the ultrasonic sensor system. The first signals may include signals corresponding to reflections of the first ultrasonic compressional wave from a target object proximate a surface of the apparatus. The method may involve performing an authentication process based, at least in part, on the first signals. The method may involve controlling the apparatus to transmit a shear wave and receiving second signals from the ultrasonic sensor system. The second signals may include signals corresponding to reflections of the shear wave from the target object. The method may involve performing a spoof detection process based, at least in part, on the second signals.

30 Claims, 16 Drawing Sheets

ANTI-SPOOFING DEVICES AND METHODS INVOLVING ACOUSTIC SHEAR WAVES

TECHNICAL FIELD

This disclosure relates generally to biometric devices and methods, including but not limited to ultrasonic sensor systems and methods for using such systems.

DESCRIPTION OF THE RELATED TECHNOLOGY

Technically savvy hackers revel in defeating the latest technical security innovations. For example, premium tier mobile phone manufacturers have had their first smartphones that incorporated fingerprint-based authentication systems successfully hacked shortly after product introduction. In some instances, spoofing may involve using a finger-like object that includes silicone rubber, polyvinyl acetate (white glue), gelatin, glycerin, etc., with a fingerprint pattern of a rightful user formed on an outside surface. In some cases, a hacker may form a fingerprint pattern of a rightful user on a sleeve or partial sleeve that can be slipped over or on the hacker's finger.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include an ultrasonic sensor system and a control system. The control system may be configured for electrical communication with the ultrasonic sensor system. In some examples, at least a portion of the control system may be coupled to the ultrasonic sensor system. In some implementations, a mobile device may be, or may include, the apparatus. For example, a mobile device may include an apparatus as disclosed herein.

The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured for controlling the ultrasonic sensor system to transmit a first ultrasonic compressional wave and for receiving first signals from the ultrasonic sensor system. The first signals may, in some examples, include signals corresponding to reflections of the first ultrasonic compressional wave from a target object proximate a surface of the apparatus. The control system may be configured for performing an authentication process based, at least in part, on the first signals. In some instances, the control system may be configured for controlling the ultrasonic sensor system to perform a target object detection process prior to performing the authentication process.

According to some such examples, the control system may be configured for controlling the apparatus to transmit a shear wave. The control system may be configured for receiving second signals from the ultrasonic sensor system. The second signals may, in some instances, include signals corresponding to reflections of the shear wave from the target object. The control system may be configured for performing a spoof detection process based, at least in part, on the second signals.

In some examples, the spoof detection process may involve estimating a target object elastic modulus and comparing the target object elastic modulus with a digit elastic modulus. According to some instances, the target object elastic modulus may be a target object shear modulus and the digit elastic modulus may be a digit shear modulus. In some implementations, the digit shear modulus may be, or may include, a bone shear modulus, an epidermis shear modulus, a cartilage shear modulus, a dermis shear modulus, a muscle shear modulus and/or a fat shear modulus.

According to some examples, the spoof detection process may involve extracting target object sub-epidermal features from the second signals, retrieving stored sub-epidermal features and comparing the target object sub-epidermal features with the stored sub-epidermal features.

In some implementations, the spoof detection process may involve extracting target object sub-epidermal image data from the second signals, retrieving stored sub-epidermal image data and comparing the target object sub-epidermal image data with the stored sub-epidermal image data.

According to some examples, the apparatus may include a haptic feedback device. In some such examples, controlling the apparatus to transmit the shear wave may involve activating the haptic feedback device.

Alternatively, or additionally, controlling the apparatus to transmit the shear wave may involve causing the shear wave to be generated by the first ultrasonic compressional wave. For example, causing the shear wave to be generated by the first ultrasonic compressional wave may involve controlling the ultrasonic sensor system to transmit the first ultrasonic compressional wave at an angle relative to the surface of the apparatus. According to some examples, the apparatus may include a layer with embedded reflectors configured to produce the shear wave in response to the first ultrasonic compressional wave. In some such examples, causing the shear wave to be generated by the first ultrasonic compressional wave may involve controlling the ultrasonic sensor system to transmit the first ultrasonic compressional wave into the layer.

In some instances, causing the shear wave to be generated by the first ultrasonic compressional wave may involve controlling the ultrasonic sensor system to focus the first ultrasonic compressional wave. According to some examples, causing the shear wave to be generated by the first ultrasonic compressional wave may involve controlling the ultrasonic sensor system to perform a beamforming and/or beam steering process that involves the first ultrasonic compressional wave.

In some implementations, controlling the apparatus to transmit the shear wave may involve applying an electric field perpendicular to a poling direction of the piezoelectric material to transmit the shear wave. In some instances, the piezoelectric material may reside in the ultrasonic sensor system. According to some such implementations, controlling the ultrasonic sensor system to transmit the first ultrasonic compressional wave may involve applying an electric field parallel to the polling direction of the piezoelectric material to transmit the first ultrasonic compressional wave.

Still other innovative aspects of the subject matter described in this disclosure can be implemented in a method of controlling an apparatus that includes an ultrasonic sensor system. The method may involve controlling, via a control system, the ultrasonic sensor system to transmit a first ultrasonic compressional wave. The method may involve receiving, by the control system, first signals from the ultrasonic sensor system. The first signals may, in some examples, include signals corresponding to reflections of the first ultrasonic compressional wave from a target object proximate a surface of the apparatus.

The method may involve performing, by the control system, an authentication process based, at least in part, on the first signals. In some examples the method may involve controlling, via the control system, the apparatus to transmit a shear wave. The method may involve receiving, by the control system, second signals from the ultrasonic sensor system. The second signals may, in some instances, include signals corresponding to reflections of the shear wave from the target object. In some examples the method may involve performing, by the control system, a spoof detection process based, at least in part, on the second signals.

In some examples, the spoof detection process may involve estimating a target object elastic modulus and comparing the target object elastic modulus with a digit elastic modulus. According to some instances, the target object elastic modulus may be a target object shear modulus and the digit elastic modulus may be a digit shear modulus. In some implementations, the digit shear modulus may be, or may include, a bone shear modulus, an epidermis shear modulus, a cartilage shear modulus, a dermis shear modulus, a muscle shear modulus and/or a fat shear modulus.

According to some examples, the spoof detection process may involve extracting target object sub-epidermal features from the second signals, retrieving stored sub-epidermal features and comparing the target object sub-epidermal features with the stored sub-epidermal features.

In some implementations, the spoof detection process may involve extracting target object sub-epidermal image data from the second signals, retrieving stored sub-epidermal image data and comparing the target object sub-epidermal image data with the stored sub-epidermal image data.

According to some examples, the apparatus may include a haptic feedback device. In some such examples, controlling the apparatus to transmit the shear wave may involve activating the haptic feedback device.

Alternatively, or additionally, controlling the apparatus to transmit the shear wave may involve causing the shear wave to be generated by the first ultrasonic compressional wave. For example, causing the shear wave to be generated by the first ultrasonic compressional wave may involve controlling the ultrasonic sensor system to transmit the first ultrasonic compressional wave at an angle relative to the surface of the apparatus. According to some examples, the apparatus may include a layer with embedded reflectors configured to produce the shear wave in response to the first ultrasonic compressional wave. In some such examples, causing the shear wave to be generated by the first ultrasonic compressional wave may involve controlling the ultrasonic sensor system to transmit the first ultrasonic compressional wave into the layer.

In some instances, causing the shear wave to be generated by the first ultrasonic compressional wave may involve controlling the ultrasonic sensor system to focus the first ultrasonic compressional wave. According to some examples, causing the shear wave to be generated by the first ultrasonic compressional wave may involve controlling the ultrasonic sensor system to perform a beamforming and/or beam steering process that involves the first ultrasonic compressional wave.

In some implementations, controlling the apparatus to transmit the shear wave may involve applying an electric field perpendicular to a poling direction of the piezoelectric material to transmit the shear wave. In some instances, the piezoelectric material may reside in the ultrasonic sensor system. According to some such implementations, controlling the ultrasonic sensor system to transmit the first ultrasonic compressional wave may involve applying an electric field parallel to the polling direction of the piezoelectric material to transmit the first ultrasonic compressional wave.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method. In some examples, the method may involve controlling an apparatus that includes an ultrasonic sensor system. The method may involve controlling, via a control system, the ultrasonic sensor system to transmit a first ultrasonic compressional wave. The method may involve receiving, by the control system, first signals from the ultrasonic sensor system. The first signals may, in some examples, include signals corresponding to reflections of the first ultrasonic compressional wave from a target object proximate a surface of the one or more devices.

The method may involve performing, by the control system, an authentication process based, at least in part, on the first signals. In some examples the method may involve controlling, via the control system, the apparatus to transmit a shear wave. The method may involve receiving, by the control system, second signals from the ultrasonic sensor system. The second signals may, in some instances, include signals corresponding to reflections of the shear wave from the target object. In some examples the method may involve performing, by the control system, a spoof detection process based, at least in part, on the second signals.

In some examples, the spoof detection process may involve estimating a target object elastic modulus and comparing the target object elastic modulus with a digit elastic modulus. According to some instances, the target object elastic modulus may be a target object shear modulus and the digit elastic modulus may be a digit shear modulus. In some implementations, the digit shear modulus may be, or may include, a bone shear modulus, an epidermis shear modulus, a cartilage shear modulus, a dermis shear modulus, a muscle shear modulus and/or a fat shear modulus.

According to some examples, the spoof detection process may involve extracting target object sub-epidermal features from the second signals, retrieving stored sub-epidermal features and comparing the target object sub-epidermal features with the stored sub-epidermal features.

In some implementations, the spoof detection process may involve extracting target object sub-epidermal image data from the second signals, retrieving stored sub-epidermal image data and comparing the target object sub-epidermal image data with the stored sub-epidermal image data.

According to some examples, the apparatus may include a haptic feedback device. In some such examples, controlling the apparatus to transmit the shear wave may involve activating the haptic feedback device.

Alternatively, or additionally, controlling the apparatus to transmit the shear wave may involve causing the shear wave to be generated by the first ultrasonic compressional wave.

For example, causing the shear wave to be generated by the first ultrasonic compressional wave may involve controlling the ultrasonic sensor system to transmit the first ultrasonic compressional wave at an angle relative to the surface of the apparatus. According to some examples, the apparatus may include a layer with embedded reflectors configured to produce the shear wave in response to the first ultrasonic compressional wave. In some such examples, causing the shear wave to be generated by the first ultrasonic compressional wave may involve controlling the ultrasonic sensor system to transmit the first ultrasonic compressional wave into the layer.

In some instances, causing the shear wave to be generated by the first ultrasonic compressional wave may involve controlling the ultrasonic sensor system to focus the first ultrasonic compressional wave. According to some examples, causing the shear wave to be generated by the first ultrasonic compressional wave may involve controlling the ultrasonic sensor system to perform a beamforming and/or beam steering process that involves the first ultrasonic compressional wave.

In some implementations, controlling the apparatus to transmit the shear wave may involve applying an electric field perpendicular to a poling direction of the piezoelectric material to transmit the shear wave. In some instances, the piezoelectric material may reside in the ultrasonic sensor system. According to some such implementations, controlling the ultrasonic sensor system to transmit the first ultrasonic compressional wave may involve applying an electric field parallel to the polling direction of the piezoelectric material to transmit the first ultrasonic compressional wave.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1A:
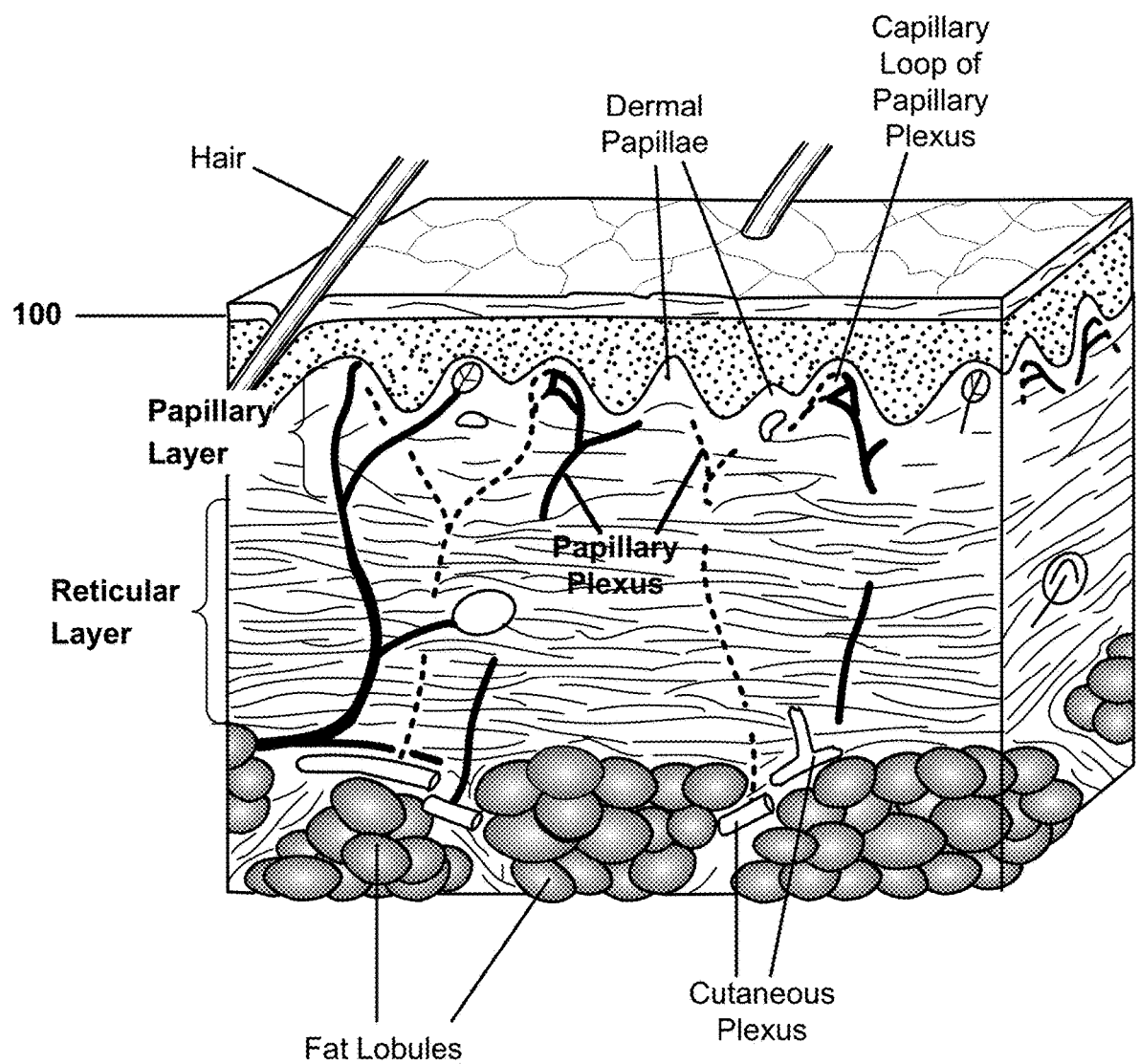
FIG. 1A shows examples of sub-epidermal features.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Some implementations may include an ultrasonic sensor system that is capable of obtaining image data from the epidermis, such as fingerprint image data, and image data that corresponds to sub-epidermal features. Data received from a sensor array, such as an ultrasonic sensor array, may be referred to herein as "image data," although the image data will generally be received in the form of electrical signals. Image data that is acquired from a surface of a target object may be referred to herein as "fingerprint image data," although the image data may in some instances be obtained from a target object that is not a digit. Accordingly, without additional processing such image data would not necessarily be perceivable by a human being as an image.

FIG. 1A shows examples of sub-epidermal features. As used herein, the term "sub-epidermal features" may refer to any of the tissue layers that underlie the epidermis 100, including the dermis, the papillary layer, the reticular layer, the subcutis, etc., and any blood vessels, lymph vessels, sweat glands, hair follicles, hair papilla, fat lobules, etc., that may be present within such tissue layers. Accordingly, sub-epidermal features also may include features not shown in FIG. 1A, such as muscle tissue, bone material, etc.

Figure 1B:
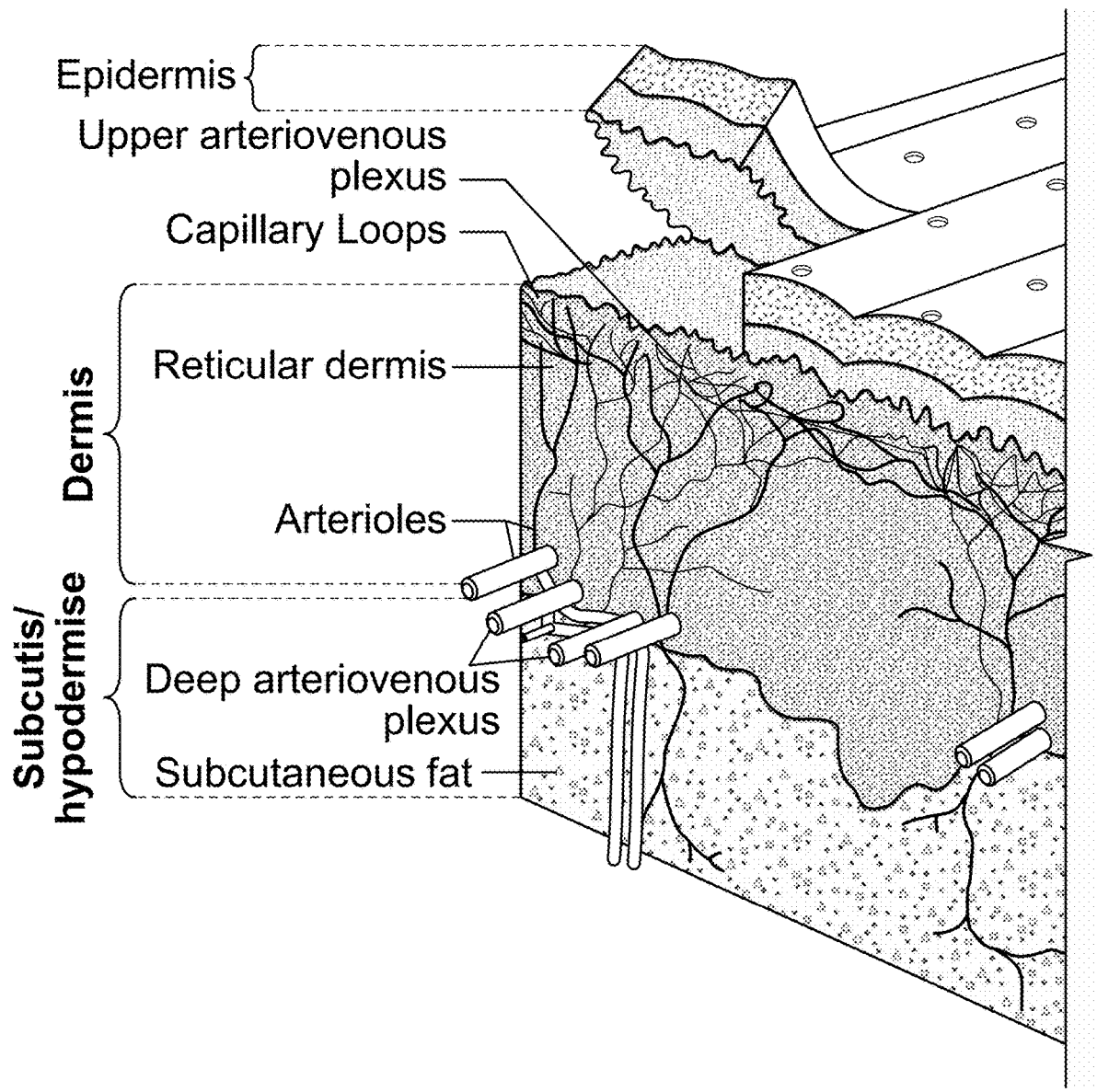
FIG. 1B shows examples of sub-epidermal features below glabrous skin.

FIG. 1B shows examples of sub-epidermal features below glabrous skin. Glabrous skin may be found on human hands and feet. Glabrous skin has a surface without hairs. In some such examples, the epidermal layer may actually be thinner than that shown in FIG. 1A, though it may not appear to be so because the figures are not drawn to scale. By comparing FIGS. 1A and 1B, one may observe that some features are different. For example, although both examples include dermal papillae, only in glabrous skin are features of the papillary layer also related to external structures: at the surface of the skin in portions of the hands and feet, they appear as epidermal or papillary ridges, which are commonly known as fingerprints. Accordingly, in such examples the epidermal layer may include fingerprint ridges and valleys.

Some implementations may be capable of performing enrollment and authentication processes that are based, at least in part, on sub-epidermal image data and/or sub-epidermal features. Some such processes also may be based on fingerprint image data, or on fingerprint minutiae or fingerprint image features such as keypoints derived from fingerprint image data. The authentication processes may involve spoof detection and/or liveness detection based, at least in part, on the sub-epidermal image data and/or sub-epidermal features.

In some examples, the spoof detection and/or liveness detection may be based, at least in part, on estimating a target object elastic modulus, such as a target object shear modulus. Such examples, may involve comparing the target object elastic modulus with a digit elastic modulus, such as a digit shear modulus. The digit shear modulus may be a bone shear modulus, an epidermis shear modulus, a cartilage shear modulus, a dermis shear modulus, a muscle shear modulus and/or a fat shear modulus.

Particular implementations of the subject matter described in this disclosure may be implemented to realize one or more of the following potential advantages. Some disclosed methods involve authentication and/or spoof detection using a combination of ultrasonic compressional waves and shear waves. The shear waves may or may not be ultrasonic, depending on the particular implementation. As noted above, some spoofing techniques are based on forming fingerprint-like features on an object, which may be a finger-like object. However, making a finger-like object with detailed sub-epidermal features, muscle tissue features and/or bone tissue features would be challenging and expensive. Making such features accurately correspond with those of an authorized user would be even more challenging. Making a detailed spoof of sub-epidermal features having elastic moduli, such as shear moduli, that matches that of actual human sub-epidermal features would be extremely challenging. Spoof detection methods based at least in part on the detection of one or more shear moduli are potentially advantageous because the shear modulus of human sub-epidermal features can vary over several orders of magnitude. Accordingly, spoof detection based on one or more of the foregoing methods has potential advantages as compared to prior methods.

Figure 2:
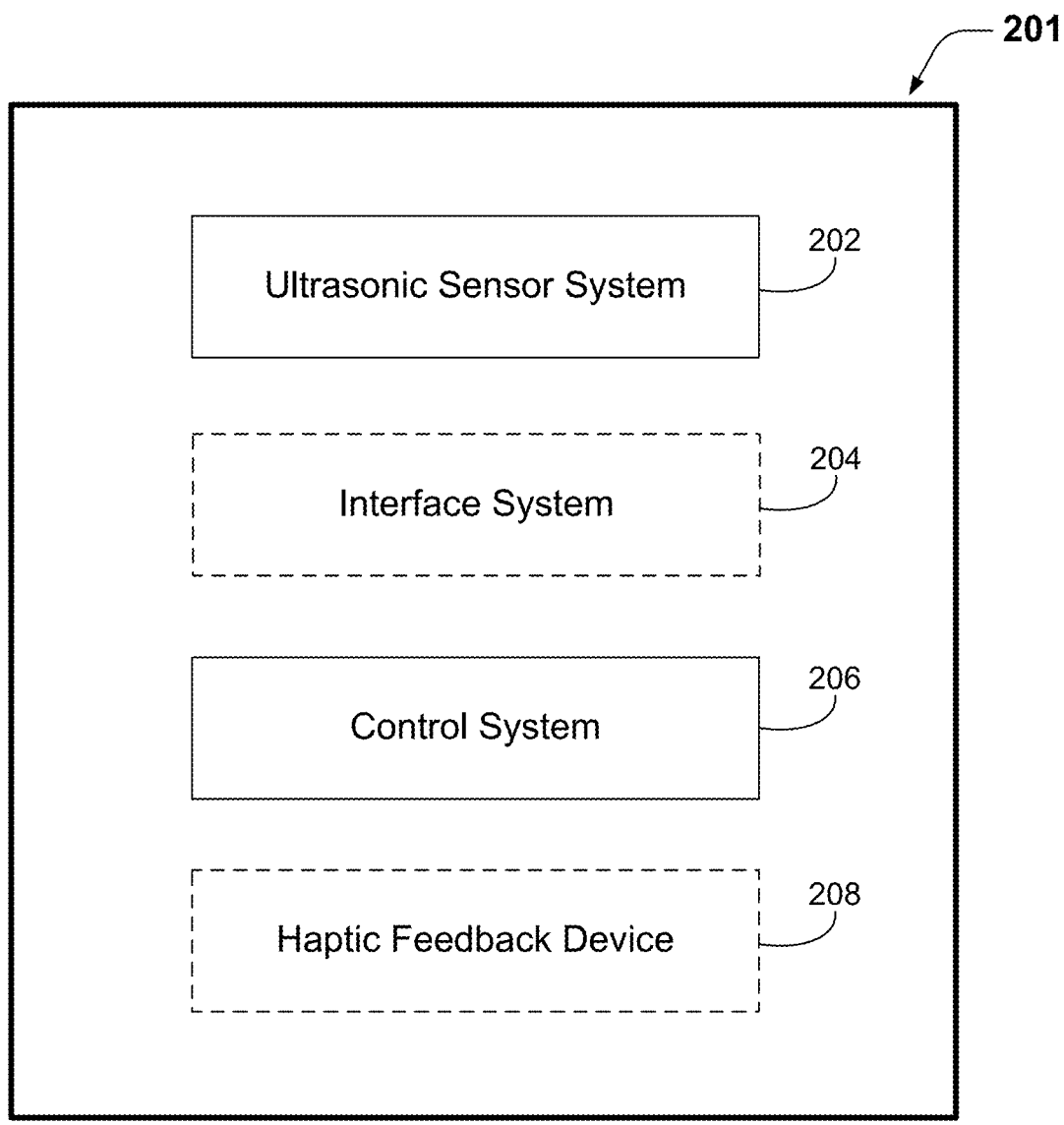
FIG. 2 is a block diagram that shows example components of an apparatus according to some disclosed implementations.

FIG. 2 is a block diagram that shows example components of an apparatus according to some disclosed implementations. In this example, the apparatus 201 includes an ultrasonic sensor system 202 and a control system 206. Although not shown in FIG. 2, the apparatus 201 may include a substrate. Some examples are described below. Some implementations of the apparatus 201 may include an interface system 204. In some examples, the apparatus 201 may include a haptic feedback device 208.

Various examples of ultrasonic sensor systems 202 are disclosed herein, some of which may include a separate ultrasonic transmitter and some of which may not. For example, in some implementations, the ultrasonic sensor system 202 may include a piezoelectric receiver layer, such as a layer of PVDF polymer or a layer of PVDF-TrFE copolymer. In some implementations, a separate piezoelectric layer may serve as the ultrasonic transmitter. In some implementations, a single piezoelectric layer may serve as the transmitter and as a receiver. In some implementations, other piezoelectric materials may be used in the piezoelectric layer, such as aluminum nitride (AlN) or lead zirconate titanate (PZT). The ultrasonic sensor system 202 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers. According to some alternative examples, the ultrasonic sensor system 202 may include an ultrasonic receiver array and one or more separate ultrasonic transmitter elements. In some such examples, the ultrasonic transmitter(s) may include an ultrasonic plane-wave generator, such as those described below.

The control system 206 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 206 also may include (and/or be configured for communication with) one or more memory devices, such as one or more random access memory (RAM) devices, read-only memory (ROM) devices, etc. Accordingly, the apparatus 201 may have a memory system that includes one or more memory devices, though the memory system is not shown in FIG. 2. The control system 206 may be capable of receiving and processing data from the ultrasonic sensor system 202, e.g., as described below. If the apparatus 201 includes one or more ultrasonic transmitters, the control system 206 may be capable of controlling the ultrasonic transmitter(s), e.g., as disclosed elsewhere herein. In some implementations, functionality of the control system 206 may be partitioned between one or more controllers or processors, such as a dedicated sensor controller and an applications processor of a mobile device.

Some implementations of the apparatus 201 may include an interface system 204. In some examples, the interface system may include a wireless interface system. In some implementations, the interface system may include a user interface system, one or more network interfaces, one or more interfaces between the control system 206 and a memory system and/or one or more interfaces between the control system 206 and one or more external device interfaces (e.g., ports or applications processors).

The interface system 204 may be configured to provide communication (which may include wired or wireless communication, such as electrical communication, radio communication, etc.) between components of the apparatus 201. In some such examples, the interface system 204 may be configured to provide communication between the control system 206 and the ultrasonic sensor system 202. According to some such examples, a portion of the interface system 204 may couple at least a portion of the control system 206 to the ultrasonic sensor system 202, e.g., via electrically conducting material. If the apparatus 201 includes an ultrasonic transmitter, the interface system 204 may be configured to provide communication between at least a portion of the control system 206 and the ultrasonic transmitter. According to some examples, the interface system 204 may be configured to provide communication between the apparatus 201 and other devices and/or human beings. In some such examples, the interface system 204 may include one or more user interfaces. The interface system 204 may, in some examples, include one or more network interfaces and/or one or more external device interfaces (such as one or more universal serial bus (USB) interfaces). In some implementations, the apparatus 201 may include a memory system. The interface system 204 may, in some examples, include at least one interface between the control system 206 and a memory system.

The apparatus 201 may be used in a variety of different contexts, many examples of which are disclosed herein. For example, in some implementations a mobile device may include at least a portion of the apparatus 201. In some implementations, a wearable device may include at least a portion of the apparatus 201. The wearable device may, for example, be a bracelet, an armband, a wristband, a ring, a headband or a patch. In some implementations, the control system 206 may reside in more than one device. For example, a portion of the control system 206 may reside in a wearable device and another portion of the control system 206 may reside in another device, such as a mobile device (e.g., a smartphone or a tablet computer). The interface system 204 also may, in some such examples, reside in more than one device.

Figure 3:
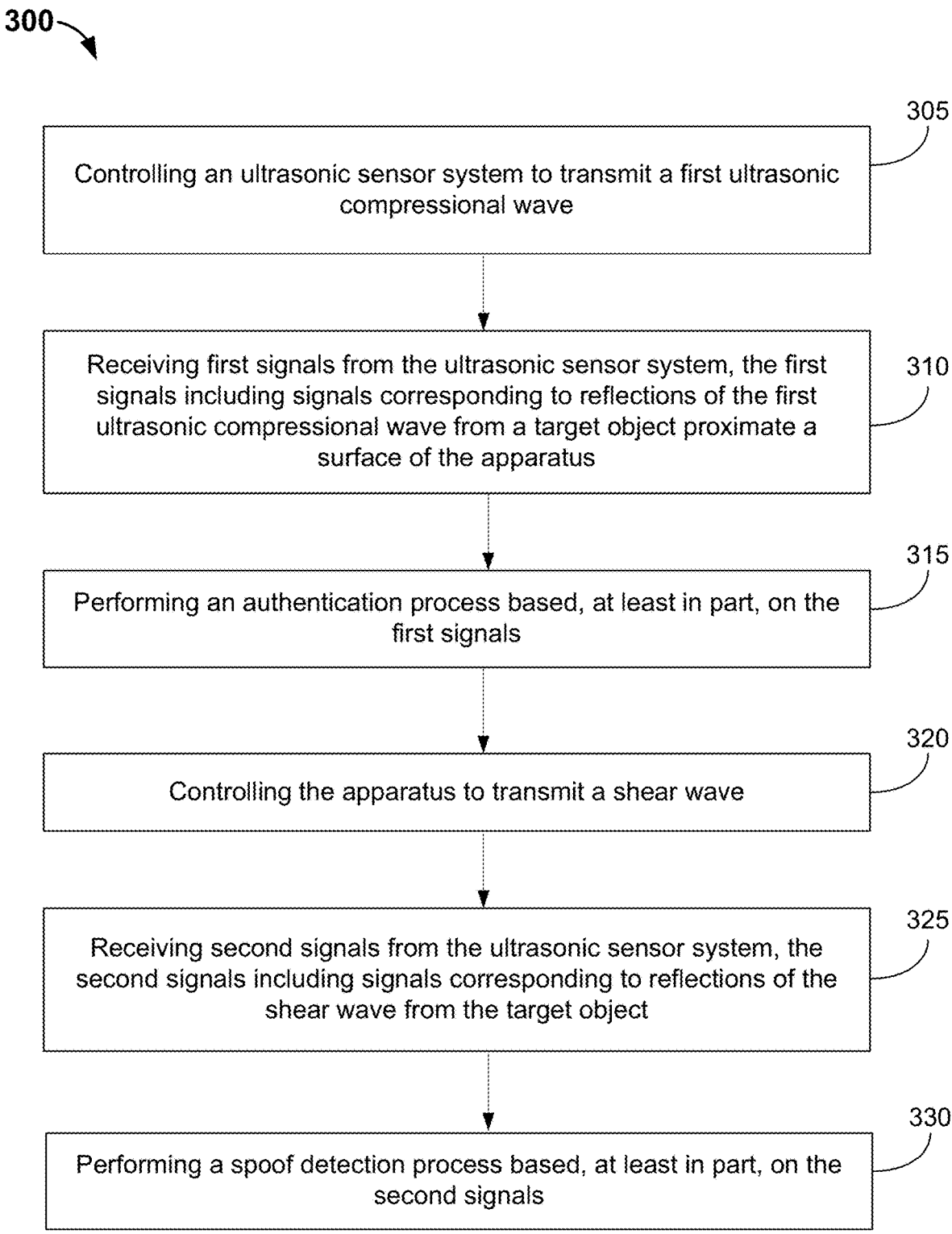
FIG. 3 is a flow diagram that provides an example of a method according to some implementations.

FIG. 3 is a flow diagram that provides an example of a method according to some implementations. The blocks of FIG. 3 (and those of other flow diagrams provided herein) may, for example, be performed by the apparatus 201 of FIG. 2 or by a similar apparatus. As with other methods disclosed herein, the method outlined in FIG. 3 may include more or fewer blocks than indicated. Moreover, the blocks of methods disclosed herein are not necessarily performed in the order indicated.

In this example, method 300 is a method of controlling an apparatus that includes an ultrasonic sensor system. Method 300 may, for example, be performed by a control system configured for electrical communication with the ultrasonic sensor system. According to this implementation, block 305 involves controlling the ultrasonic sensor system to transmit a first ultrasonic compressional wave.

According to this example, block 310 involves receiving first signals from the ultrasonic sensor system. In this example, the first signals include signals corresponding to reflections of the first ultrasonic compressional wave from a target object proximate a surface of the apparatus. The target object may, in some examples, be a person's finger, such as a user's finger. However, in other examples the target object may be an artificial finger-like object, which may be referred to as a "fake finger." As used herein, the term "finger" may be used synonymously with the term "digit," such that the term "fingerprint" will be broad enough to include a thumbprint.

In this example, block 315 involves performing an authentication process that is based, at least in part, on the first signals. Block 315 may, for example, be based at least in part on fingerprint image data extracted from the first signals, or on fingerprint features such as fingerprint minutiae and/or keypoints derived from the fingerprint image data. In some examples, block 315 may involve comparing "attribute information" that is extracted from the first signals and/or other signals with stored attribute information that has previously been received from an authorized user during an enrollment process. The attribute information obtained from the received image data and the stored attribute information that are compared during an authentication process may include biometric template data corresponding to the received image data and biometric template data corresponding to the stored image data. Such biometric template data may include fingerprint template data, which may fingerprint features such as the types and locations of fingerprint minutia or keypoints. A user authentication process based on attributes of fingerprint image data may involve comparing received and stored fingerprint template data. Such a process may or may not involve directly comparing received and stored fingerprint image data.

According to this example, block 320 involves controlling the apparatus to transmit a shear wave. Various methods of controlling an apparatus to transmit a shear wave are disclosed herein, some of which are described in detail below.

For example, in some implementations the apparatus may include a haptic feedback device, such as a device configured to produce vibrations. According to some such implementations, controlling the apparatus to transmit the shear wave may involve activating the haptic feedback device. Some such haptic feedback devices may include an eccentric rotating mass (ERM) actuator. Some haptic feedback devices may include a linear resonant actuator (LRA), which may include a magnetic coil configured to move a mass in a reciprocal manner. In some instances, a mobile device, such as a cellular telephone, may include the haptic feedback device.

In this example, block 325 involves receiving second signals from the ultrasonic sensor system. According to this example, the second signals include signals corresponding to reflections of the shear wave from the target object. In this implementation, block 330 involves performing a spoof detection process based, at least in part, on the second signals.

According to some examples, the spoof detection process may involve estimating one or more target object elastic moduli and comparing the one or more target object elastic moduli with one or more digit elastic moduli. A digit elastic modulus may be a known value of an elastic modulus corresponding to a component of a human digit, such as an elastic modulus of a blood vessel, a bone, cartilage, epidermis, dermis, muscle tissue, fat tissue, a blood vessel, etc.

In some implementations, the target object elastic modulus may be a target object shear modulus and the digit elastic modulus may be a digit shear modulus. For example, the digit shear modulus may be a bone shear modulus, an epidermis shear modulus, a cartilage shear modulus, a dermis shear modulus, a muscle shear modulus and/or a fat shear modulus.

Figure 4:
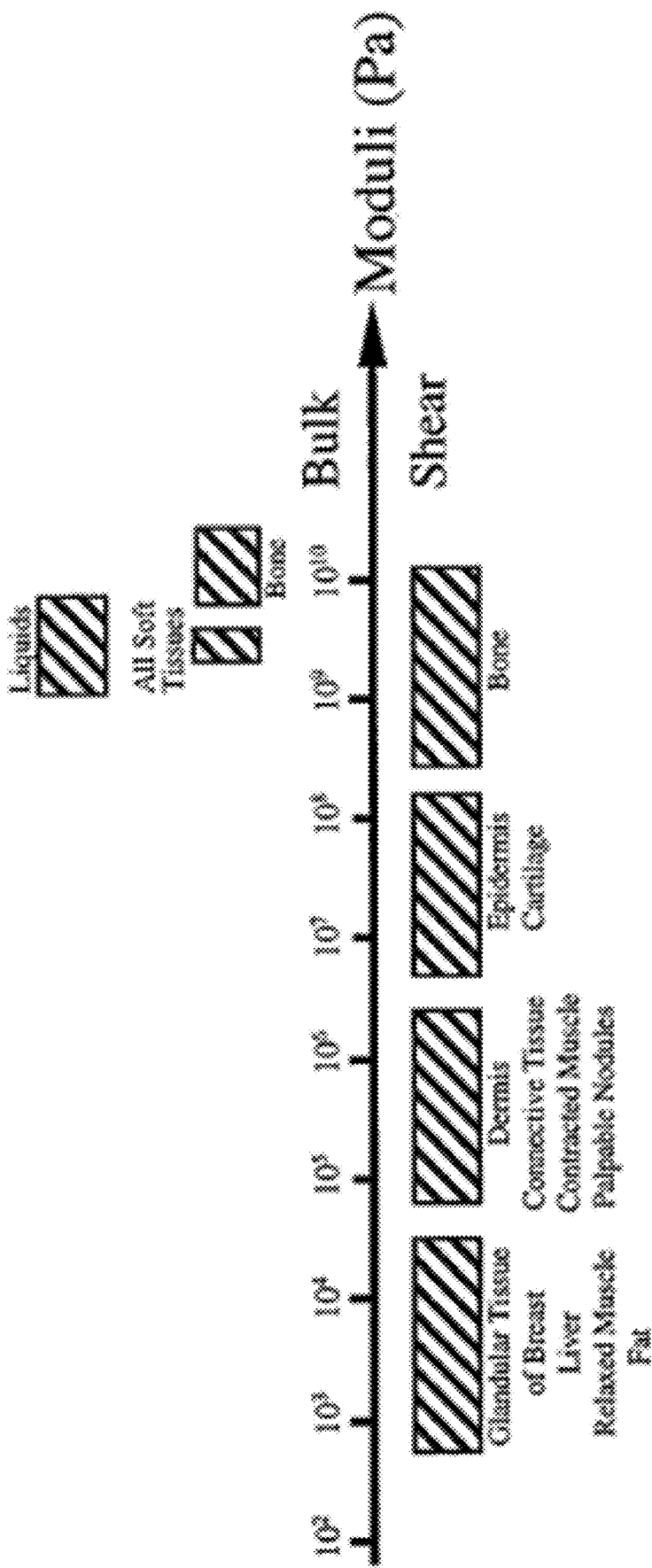
FIG. 4 is a graph that indicates ranges of bulk and shear moduli of various substances.

FIG. 4 is a graph that indicates ranges of bulk and shear moduli of various substances. The units shown in FIG. 4 are pascals. As shown in FIG. 4, the bulk moduli of all soft tissues are within a relatively narrow range. Common spoofing materials include Ecoflex™ (Young's modulus 610 MPa), Body Double™ (Young's modulus 930 MPa) and urethane (Young's modulus 650-1000 MPa depending on the mix ratio). The bulk modulus is proportional to Young's modulus. The bulk modulus for all of these spoofing materials is in the range of $10^9$ to $10^{10}$ pascals. However, FIG. 4 also shows that the shear moduli of various soft tissues that may be found in a human digit range over several orders of magnitude. Bulk moduli may be estimated according to a material's response to compressional waves, whereas shear moduli may be estimated according to a material's response to shear waves. The shear wave velocity may be calculated by taking the square root of the shear modulus divided by the density of the material. Spoof detection methods based at least in part on the detection of one or more shear moduli are potentially advantageous because the shear modulus of human epidermal and sub-epidermal features can vary over several orders of magnitude.

Returning to FIG. 3, according to some examples the spoof detection and/or authentication process of method 300 may involve extracting target object sub-epidermal image data from the second signals, retrieving stored sub-epidermal image data and comparing the target object sub-epidermal image data with the stored sub-epidermal image data. Alternatively, or additionally, the spoof detection and/or authentication process of method 300 may involve extracting target object sub-epidermal features from the second signals, retrieving stored sub-epidermal features and comparing the target object sub-epidermal features with the stored sub-epidermal features.

According to some such examples, the above-referenced attribute information may include information regarding sub-epidermal features, such as information regarding features of the dermis, features of the subcutis, blood vessel features, lymph vessel features, sweat gland features, hair follicle features, hair papilla features and/or fat lobule features, along with minutiae or keypoint information associated with an enrolled fingerprint.

Alternatively, or additionally, in some implementations the attribute information obtained from the received image data and the stored attribute information may include information regarding bone tissue features, muscle tissue features and/or epidermal or sub-epidermal tissue features. For example, according to some implementations, the user authentication process may involve obtaining fingerprint image data and sub-epidermal image data. In such examples, the authentication process may involve evaluating attribute information obtained from the fingerprint image data and the sub-epidermal image data.

Similarly, biometric template data corresponding to sub-epidermal features may include information regarding the attributes of blood vessels, such as information regarding the types and locations of blood vessel features, such as blood vessel size, blood vessel orientation, the locations of blood vessel branch points, etc. Alternatively, or additionally, biometric template data corresponding to sub-epidermal features may include attribute information regarding the types (e.g., the sizes, shapes, orientations, etc.) and locations of features of the dermis, features of the subcutis, lymph vessel features, sweat gland features, hair follicle features, hair papilla features, fat lobule features, muscle tissue and/or bone material.

Figure 5:
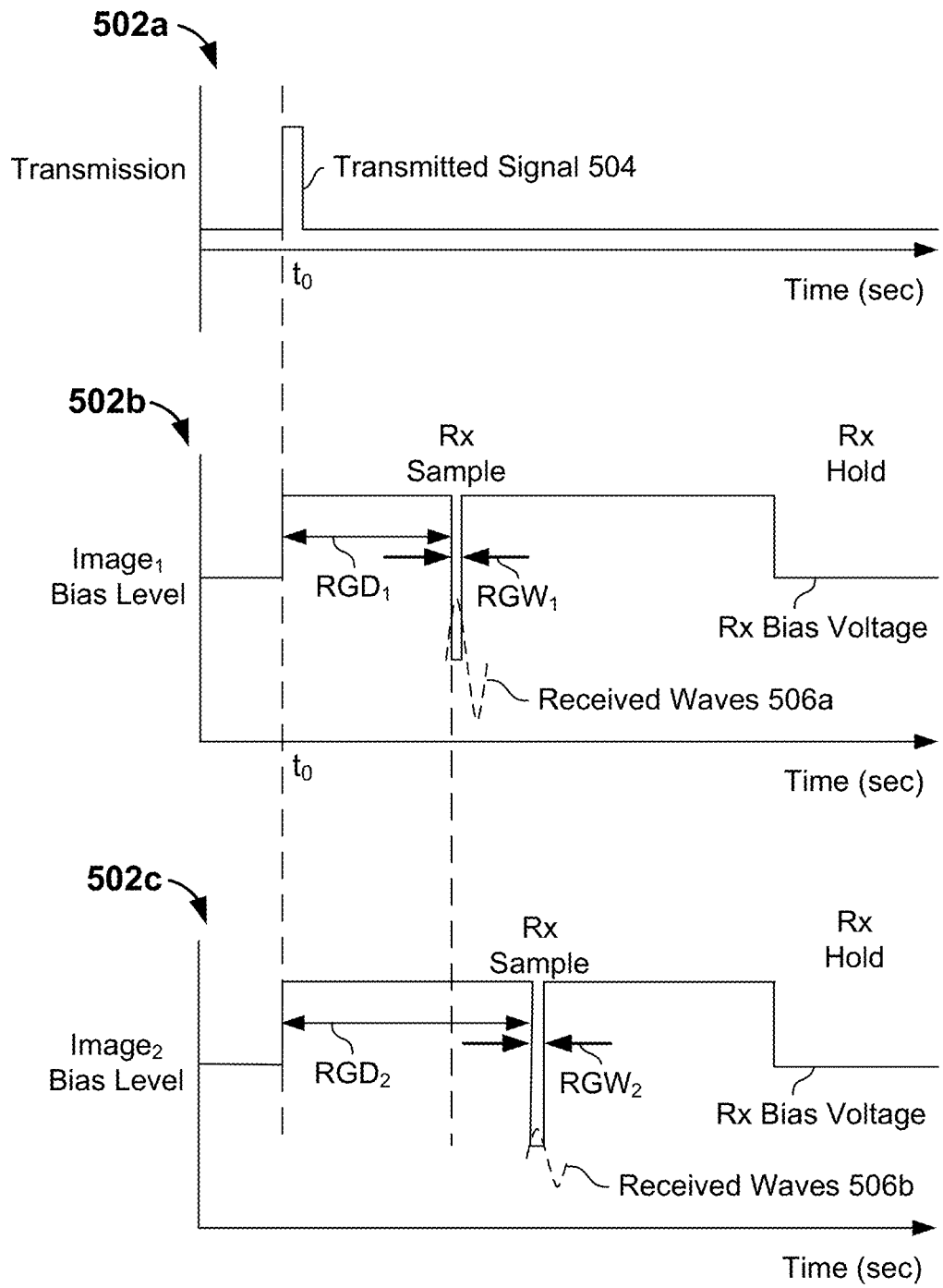
FIG. 5 shows examples of acquisition time delays and acquisition time windows according to some implementations.

FIG. 5 shows examples of acquisition time delays and acquisition time windows according to some implementations. FIG. 5 provides an example of what may be referred to herein as "DBIAS sampling," in which the receiver bias voltage level changes when a signal is sampled. In this example, the receiver bias voltage level also changes when a signal is transmitted. In FIG. 5, an acquisition time delay is labeled as "RGD," an acronym for "range-gate delay," and an acquisition time window is labeled as "RGW," an acronym for "range-gate window." Graph 502a shows a transmitted signal 504 that is initiated at a time $t_0$. The transmitted signal 504 may, for example, be a pulse of ultrasound. The pulse of ultrasound may, for example, correspond to the "first ultrasonic compressional wave" that is described above with reference to block 305 of FIG. 3. In alternative examples, multiple pulses of ultrasound may be transmitted.

Graph 502b shows examples of a first acquisition time delay $RGD_1$ and a first acquisition time window $RGW_1$. The received waves 506a represent reflected compressional waves that are received by an ultrasonic sensor array and sampled during the first acquisition time window $RGW_1$, after the first acquisition time delay $RGD_1$. In some examples, the acquisition time delay may be in the range of about 10 nanoseconds to about 20,000 nanoseconds or more. In some implementations, the first acquisition time window may be in the range of 5 to 50 nanoseconds, or in the range of approximately 5 to 50 nanoseconds. In some examples, "approximately" or "about" may mean within +/−5%, whereas in other examples "approximately" or "about" may mean within +/−10%, +/−15% or +/−20%. However, in some implementations the first acquisition time window may be more than 50 nanoseconds.

According to some examples, the apparatus 201 may include a platen. The platen may be positioned with respect to the ultrasonic sensor system 202. For example, the platen may be positioned proximate the ultrasonic sensor system 202 and/or attached to the ultrasonic sensor system 202. In some such examples, the first acquisition time delay may correspond to an expected amount of time for an ultrasonic compressional wave reflected from a surface of the platen to be received by at least a portion of the ultrasonic sensor system 202. Accordingly, the first acquisition time delay and the first acquisition time window may be selected to capture one or more fingerprint features of a target object placed on a surface of a platen. For example, in some implementations with a platen about 400 microns thick, the acquisition time delay (RGD) may be set to about 1,000 nanoseconds and the acquisition time window (RGW) may be set to about 50 nanoseconds.

Graph 502c shows examples of a second acquisition time delay $RGD_2$ and a second acquisition time window $RGW_2$. In this example, the transmitted signal 504 is a shear wave. The received waves 506b represent reflected shear waves that are received by an ultrasonic sensor array and sampled during the second acquisition time window $RGW_2$, after the second acquisition time delay $RGD_2$. In this example, the first acquisition time delay is greater than the second acquisition time delay. For example, the second acquisition time delay may be selected in view of the relatively lower velocity of shear waves, as compared to compressional waves. In this example, the first acquisition time delay and the second acquisition time delay are both measured from the time $t_0$. However, in other implementations, the first acquisition time delay and the second acquisition time delay may be measured from a different initial time According to some implementations, the second acquisition time delay and the second acquisition time window may be selected to capture one or more sub-epidermal features of the target object. For example, in some implementations with a platen about 400 microns thick, the second acquisition time delay ($RGD_2$) may be set to a value in the range of 3 to 5 milliseconds. In some implementations, the second acquisition time window ($RGW_2$) may be in the range of 5 to 50 nanoseconds, or in the range of approximately 5 to 50 nanoseconds.

Figure 6A:
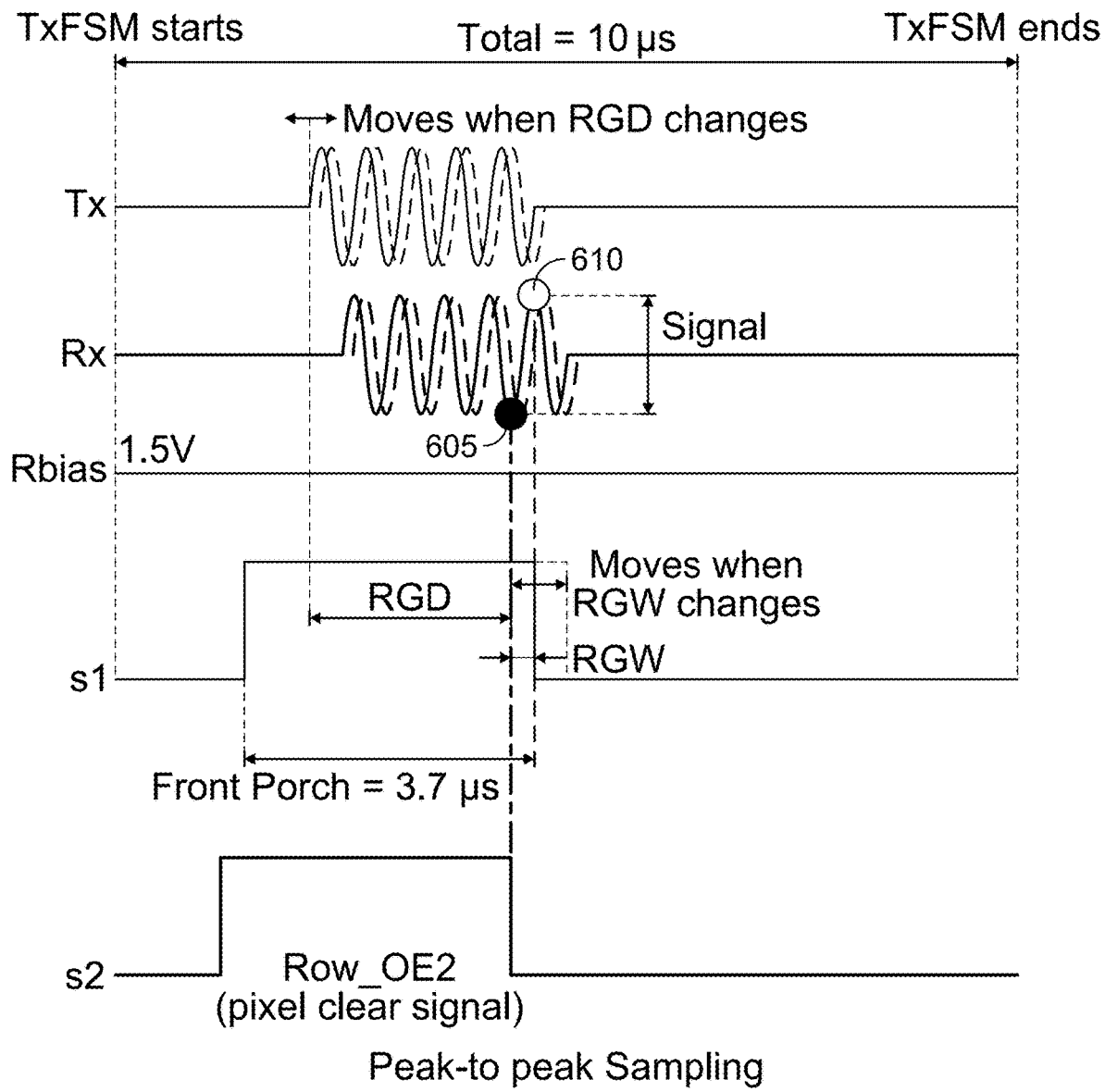
FIG. 6A shows examples of acquisition time delays and acquisition time windows according to some alternative implementations.

FIG. 6A shows examples of acquisition time delays and acquisition time windows according to some alternative implementations. FIG. 6A provides an example of what may be referred to herein as "peak to peak sampling." Unlike DBIAS sampling, with peak to peak sampling the receiver bias voltage level (labeled Rbias in FIG. 6A) does not change when a signal is sampled.

The specific values noted in FIG. 6A, including the time and voltage values, are merely provided by way of example and are in no way limiting. As noted in FIG. 6A, this example of peak-to-peak involves sampling based on the times of the received negative signal peak 605 and the received positive signal peak 610. According to this example, the RGW corresponds to the time interval between the received negative signal peak 605 and the received positive signal peak 610. In this example RGW corresponds to a half cycle of the driving frequency, which in some examples may be in the range of 10 to 200 ns.

This example of peak-to-peak sampling involves 2 extra control signals, which are labeled S1 and S2 in FIG. 6A. In this example of peak-to-peak sampling, RGW and RGD are used to control when to sample. However, the definition of RGD is different in this example from that of the DBIAS sampling example of FIG. 5. In this example of peak-to-peak sampling, RGD changes when RGW changes. In other words, RGD is linked to the time of the received positive signal peak 610. One benefit of peak-to-peak sampling is that one can reduce the tone burst voltage, which in turn leads to a cost reduction on electronic components, better reliability etc.

Figure 6B:
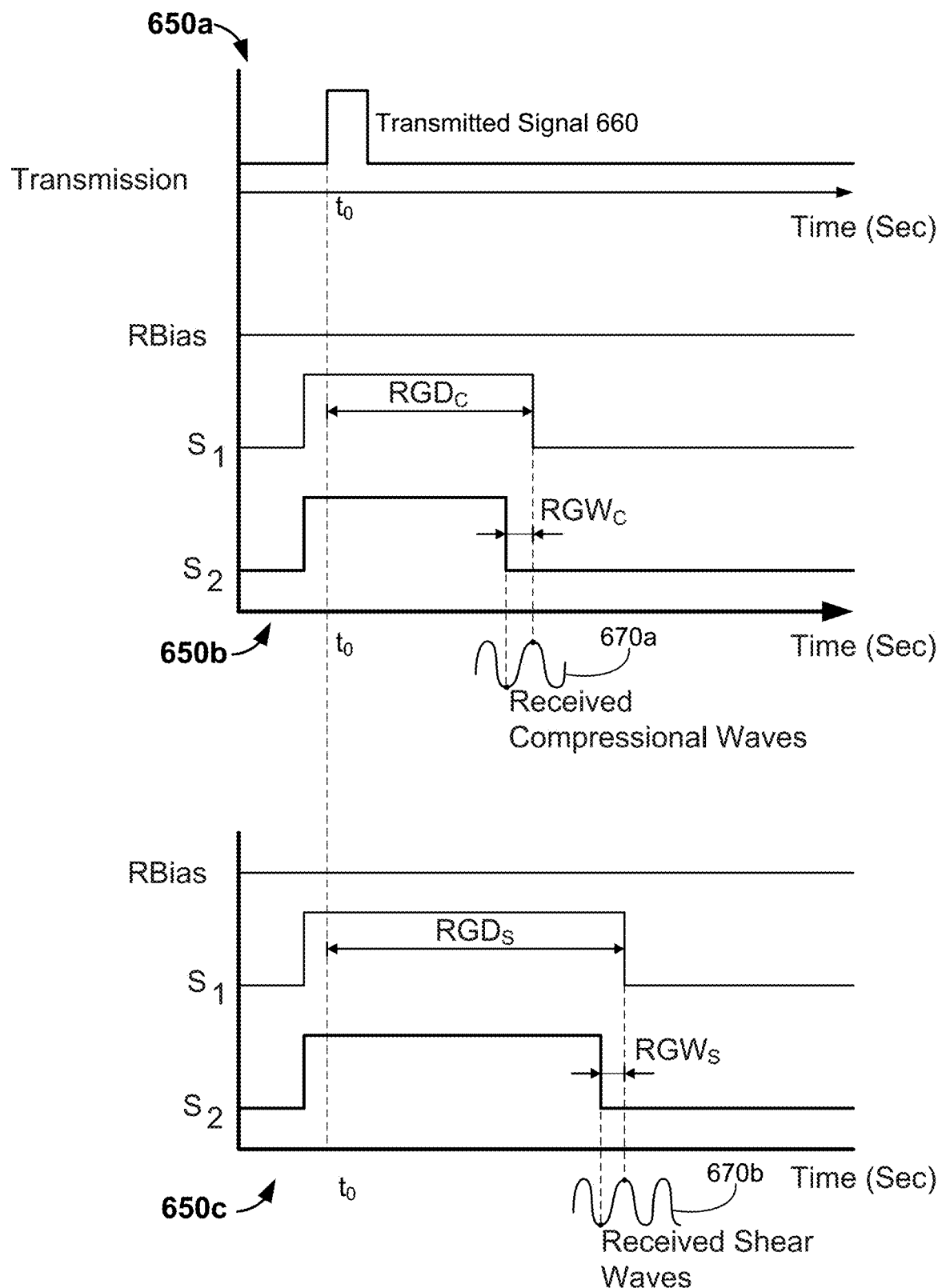
FIG. 6B shows examples of acquisition time delays and acquisition time windows for compressional waves and shear waves according to some implementations of peak to peak sampling.

FIG. 6B shows examples of acquisition time delays and acquisition time windows for compressional waves and shear waves according to some implementations of peak to peak sampling. Graph 650a shows a transmitted signal 660 that is initiated at a time $t_0$. The transmitted signal 660 may, for example, be a pulse of ultrasound. The pulse of ultrasound may, for example, correspond to the "first ultrasonic compressional wave" that is described above with reference to block 305 of FIG. 3. In alternative examples, multiple pulses of ultrasound may be transmitted.

Graph 650b shows examples of a first acquisition time delay $RGD_C$ and a first acquisition time window $RGW_C$. The received waves 670a represent reflected compressional waves that are received by an ultrasonic sensor array and sampled during the first acquisition time window $RGW_C$, after the first acquisition time delay $RGD_C$. In some examples, the acquisition time delay may be in the range of about 10 nanoseconds to about 20,000 nanoseconds or more. In some implementations, the first acquisition time window may be in the range of 5 to 50 nanoseconds, or in the range of approximately 5 to 50 nanoseconds. In some examples, "approximately" or "about" may mean within +/−5%, whereas in other examples "approximately" or "about" may mean within +/−10%, +/−15% or +/−20%. However, in some implementations the first acquisition time window may be more than 50 nanoseconds.

Graph 650c shows examples of a second acquisition time delay $RGD_S$ and a second acquisition time window $RGW_S$. In this example, the transmitted signal 660 is a shear wave. The received waves 670b represent reflected shear waves that are received by an ultrasonic sensor array and sampled during the second acquisition time window $RGW_S$, after the second acquisition time delay $RGD_S$. In this example, the first acquisition time delay is greater than the second acquisition time delay. For example, the second acquisition time delay may be selected in view of the relatively lower velocity of shear waves, as compared to compressional waves. In this example, the first acquisition time delay and the second acquisition time delay are both measured from the time $t_0$. However, in other implementations, the first acquisition time delay and the second acquisition time delay may be measured from a different initial time.

According to some implementations, the second acquisition time delay and the second acquisition time window may be selected to capture one or more sub-epidermal features of the target object. For example, in some implementations with a platen about 400 microns thick, the second acquisition time delay ($RGD_S$) may be set to a value in the range of 3 to 5 milliseconds. In some implementations, the second acquisition time window ($RGW_S$) may be in the range of 5 to 50 nanoseconds, or in the range of approximately 5 to 50 nanoseconds.

Referring again to FIG. 3, in some examples block 320 involves causing the shear wave to be generated by a compressional wave. According to some implementations, controlling the apparatus to transmit the shear wave involves causing the shear wave to be generated by the first ultrasonic compressional wave. However, other implementations may involve causing the shear wave to be generated by another ultrasonic compressional wave. According to some such implementations, the apparatus may include a layer with embedded structures, such as reflectors, configured to produce the shear wave in response to the first ultrasonic compressional wave. Causing the shear wave to be generated by the first ultrasonic compressional wave may involve controlling the ultrasonic sensor system to transmit the first ultrasonic compressional wave into the layer. In some such examples, the layer may be, or may include, a wave guide.

Figure 7:
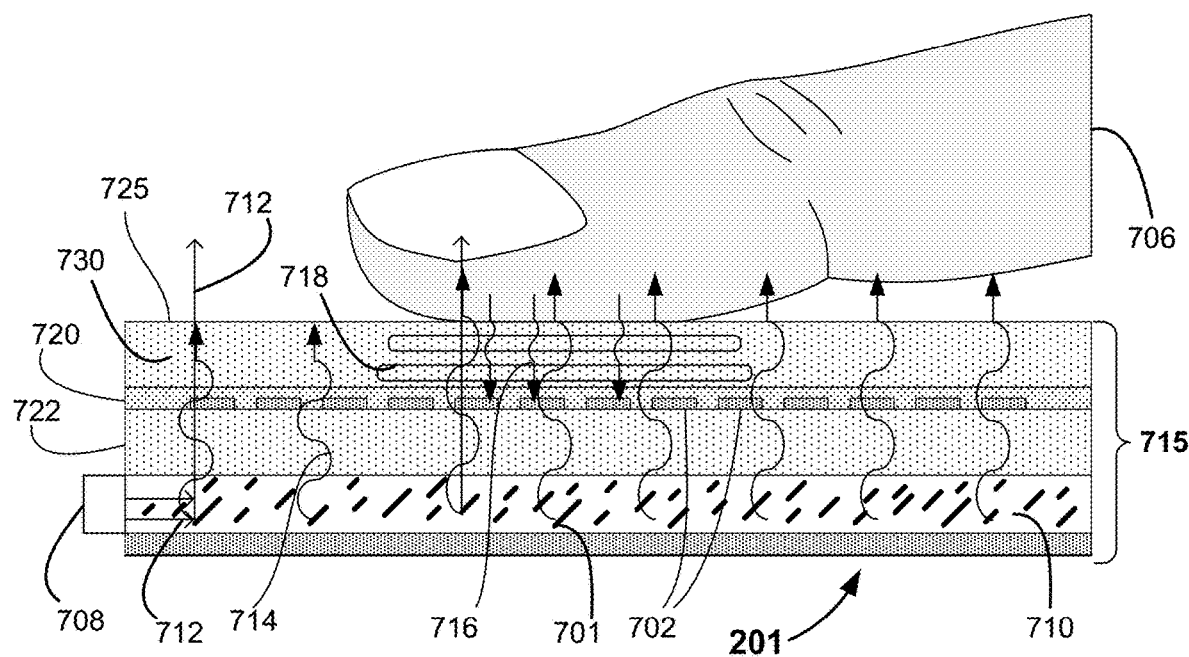
FIG. 7 shows an example of a cross-sectional view of an apparatus capable of performing at least some methods that are described herein.

FIG. 7 shows an example of a cross-sectional view of an apparatus capable of performing at least some methods that are described herein. For example, the apparatus 201 may be capable of performing the methods that are described herein with reference to FIGS. 2 and 3. The apparatus 201 is an example of a device that may be included in a biometric system such as those disclosed herein. Here, the apparatus 201 is an example of the apparatus 201 that is described above with reference to FIG. 2. As with other implementations shown and described herein, the types of elements, the arrangement of the elements and the dimensions of the elements illustrated in FIG. 7 are merely shown by way of example. According to some implementations, the apparatus 201 of FIG. 7 may be suitable for obtaining B-scan and/or C-scan image data.

In this example, the ultrasonic sensor system 202 includes an ultrasonic transmitter 708 that is separate from the ultrasonic receiver array 702. In some examples, the ultrasonic transmitter 708 may function as a plane-wave ultrasonic transmitter. In some implementations, the ultrasonic transmitter 708 may include a piezoelectric transmitter layer with transmitter excitation electrodes disposed on each side of the piezoelectric transmitter layer.

In this example, the sensor stack 715 includes a layer 710 to which the ultrasonic transmitter 708 is acoustically coupled. In this implementation, the ultrasonic transmitter 708 is configured to transmit ultrasonic compressional waves 712 into the layer 710. According to this example, the layer 710 includes embedded structures 701, which in this implementation are acoustic reflectors configured both to reflect the compressional waves 712 and to produce shear waves 714 in response to impingement of the ultrasonic compressional waves 712. According to some examples, the acoustic reflectors are positioned at an angle of approximately 45 degrees (e.g., an angle between 40 degrees and 50 degrees) relative to the propagation direction of the compressional waves 712. According to some examples, the acoustic reflectors are positioned at an angle of approximately 45 degrees relative to the upper surface 725. In some examples, the layer 710 may be, or may include, an acoustic wave guide. According to some implementations, the material or materials from which the embedded structures 701 are formed have an impedance contrast with the surrounding material(s) of the layer 710. For example, the embedded structures 701 may be formed of an aluminum composite if the surrounding material of the layer 710 is rubber. In alternative implementations, the embedded structures 701 may be formed of silicon rubber or lead acrylic if the surrounding material of the layer 710 is metal.

In this example, at least some of the shear waves 714 have been transmitted from the layer 710 through the overlying layers of the sensor stack 215 and into a finger 706 that is in contact with an upper surface 725. The various layers of the sensor stack 715 may, in some examples, include one or more substrates of glass or other material (such as plastic or sapphire) that is transparent, or at least substantially transparent, to visible light. The arrows 716 represent shear waves reflected from a sub-epidermal portion of the finger 706. At least some of the shear waves 714 also may be reflected from an epidermal portion of the finger 706.

In this example, at least some of the compressional waves 712 have been transmitted from the layer 710 through the overlying layers of the sensor stack 215 and to the finger 706. Compressional waves 718 have been reflected from an epidermal portion and/or a sub-epidermal portion of the finger 706.

In some examples, the ultrasonic receiver array 702 may include an array of pixel input electrodes and sensor pixels formed in part from TFT circuitry, an overlying piezoelectric receiver layer 720 of piezoelectric material such as PVDF or PVDF-TrFE, and an upper electrode layer positioned on the piezoelectric receiver layer, which will sometimes be referred to herein as a receiver bias electrode.

In this implementation, the layer 710 is coupled to a thin-film transistor (TFT) substrate 722 for the ultrasonic sensor system 202. According to this example, a piezoelectric receiver layer 720 overlies the sensor pixels 202 of the ultrasonic sensor system 202 and a platen 225 overlies the piezoelectric receiver layer 720. Accordingly, in this example the apparatus 201 is capable of transmitting the ultrasonic waves 214 through one or more substrates of the sensor stack 215 that include the ultrasonic sensor system 202 with substrate 722 and the layer 730. Layer 730 may be a platen or a display stack, depending on the particular implementation. In some implementations, sensor pixels 202 of the ultrasonic sensor system 202 may be optically transparent, partially optically transparent or substantially optically transparent, such that the apparatus 201 may be capable of transmitting light from a light source system through at least some elements of the ultrasonic sensor system 202. In some implementations, the ultrasonic sensor system 202 and associated circuitry may be formed on or in a glass, plastic or silicon substrate.

In alternative implementations, the ultrasonic sensor system 202 and the ultrasonic transmitter may be combined in an ultrasonic transceiver array. For example, in some implementations, the ultrasonic sensor system 202 may include a piezoelectric receiver layer, such as a layer of PVDF polymer or a layer of PVDF-TrFE copolymer. In some implementations, a separate piezoelectric layer may serve as the ultrasonic transmitter. In some examples, a single piezoelectric layer may serve as the transmitter and as a receiver. In some implementations, other piezoelectric materials may be used in the piezoelectric layer, such as aluminum nitride (AlN) or lead zirconate titanate (PZT). The ultrasonic sensor system 202 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers.

According to some implementations, the process of causing the shear wave to be generated by the first ultrasonic compressional wave (see, e.g., block 320 of FIG. 3) involves controlling the ultrasonic sensor system to perform a beamforming process that involves the first ultrasonic compressional wave. For example, the beamforming process may involve focusing one or more beams of ultrasound on one or more areas of a target object. If the target object is a digit, such focused beams can cause tissue displacement and the creation of shear waves.

In some such implementations, an array of PMUTs or CMUTs may be configured to perform the beamforming process. Some relevant methods are described in paragraphs 31-63 and illustrated in the corresponding figures of U.S. patent application Ser. No. 14/883,586, entitled "SUPERPIXEL ARRAY OF PIEZOELECTRIC ULTRASONIC TRANSDUCERS FOR 2-D BEAMFORMING" and filed on Oct. 15, 2015, which is hereby incorporated by reference. In alternative implementations, an ultrasonic transmitter layer may be configured to perform the beamforming process. For example, individually addressable electrodes that are electrically connected to the ultrasonic transmitter layer may be controlled to apply a phase shift between adjacent regions of the ultrasonic transmitter layer, thereby producing constructive interference between at least some ultrasonic waves emitted by the adjacent regions.

Figure 8A:
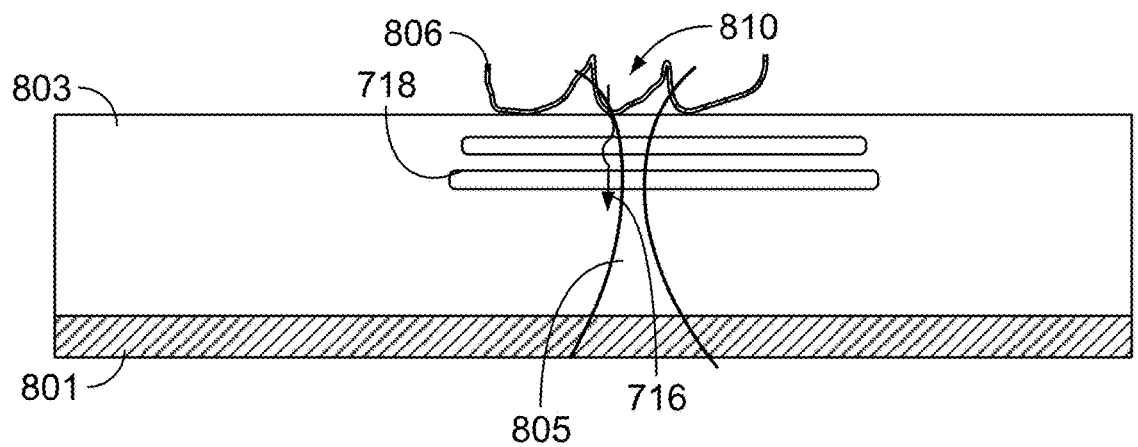
FIG. 8A shows an example of an ultrasonic sensor system configured for producing shear waves via beamforming.

FIG. 8A shows an example of an ultrasonic sensor system configured for producing shear waves via beamforming. In this example, the ultrasonic sensor system includes an ultrasonic transceiver layer 801 that is configured for both transmitting and receiving ultrasonic waves. According to this implementation, the ultrasonic transceiver layer 801 is configured for beamforming. In the example shown in FIG. 8A, the ultrasonic transceiver layer 801 is shown transmitting a beam of compressional waves 805 through an overlying layer 803, which includes an OLED display stack in this example, to a finger 806 that is in contact with the overlying layer 803. In this example, the beam of compressional waves 805 causes differential expansion of the region 810 relative to other regions of the finger 806, resulting in the generation of shear waves 716. In this example, a portion of the beam of compressional waves 805 produces reflected compressional waves 718.

Figure 8B:
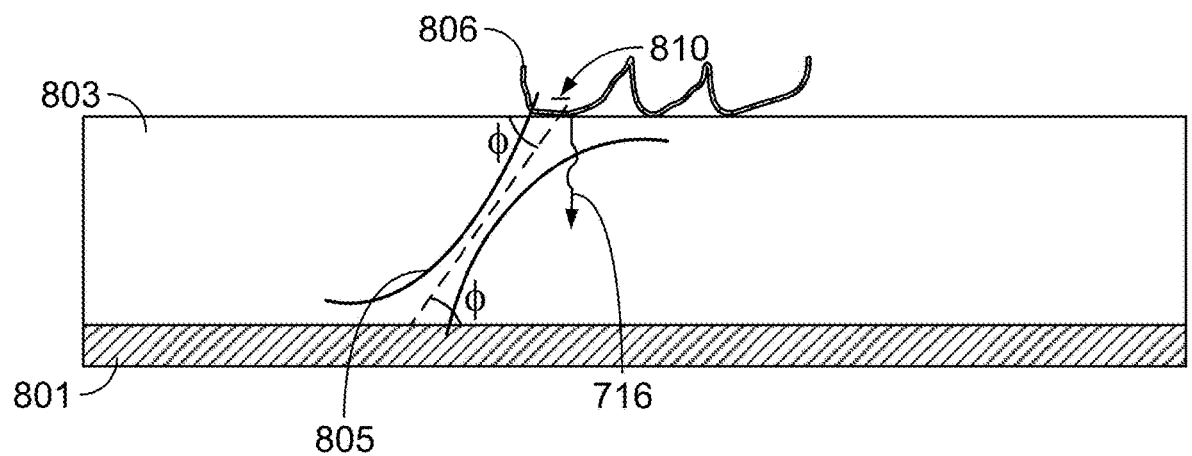
FIG. 8B shows another example of an ultrasonic sensor system configured for producing shear waves via beamforming and beam steering.

FIG. 8B shows another example of an ultrasonic sensor system configured for producing shear waves via beamforming. This is one instance in which causing a shear wave to be generated by ultrasonic compressional wave involves controlling the ultrasonic sensor system to transmit the first ultrasonic compressional wave at an angle relative to the surface of the apparatus. In this example, the ultrasonic transceiver layer 801 is configured transmitting a beam of compressional waves 805 at an angle through an overlying layer 803 to a finger 806 that is in contact with the overlying layer 803. In this example, the angle is greater than a critical angle for compressional waves. Accordingly, the beam of compressional waves 805 causes the generation of shear waves 716 but does not produce reflected compressional waves.

Figure 9A:
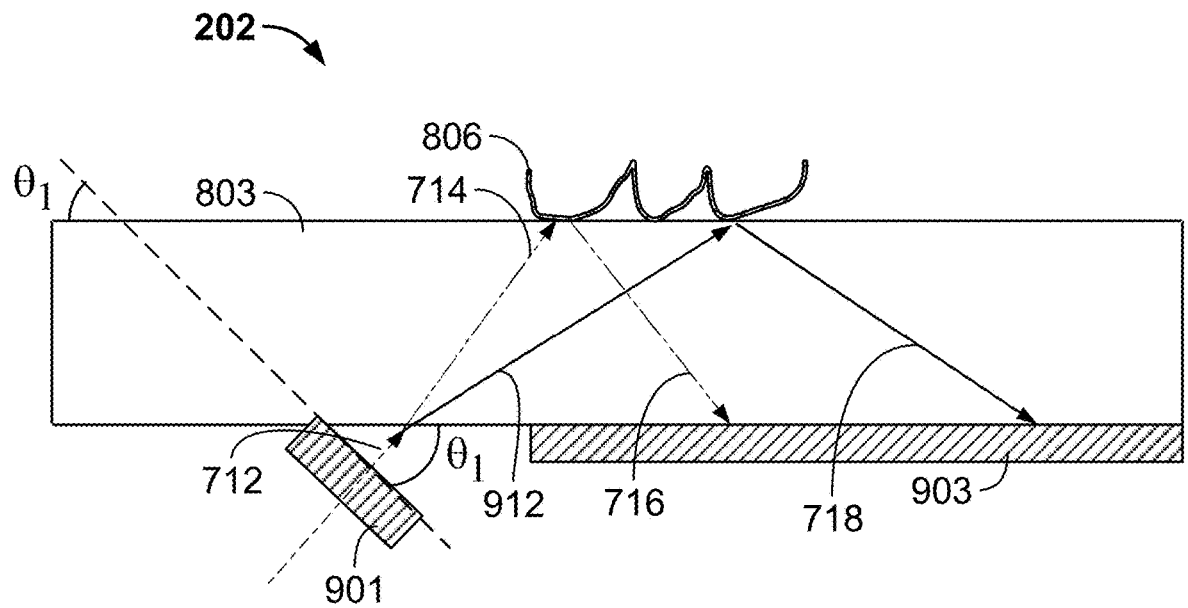
FIG. 9A shows an example of a single element ultrasonic sensor system configured for producing shear waves and longitudinal waves.

FIG. 9A shows another example of an ultrasonic sensor system configured for producing shear waves. This is another instance in which causing a shear wave to be generated by ultrasonic compressional wave involves controlling the ultrasonic sensor system to transmit the first ultrasonic compressional wave at an angle relative to the surface of the apparatus. According to this example, the ultrasonic sensor system 202 includes a transmitting portion 901 and a receiving portion 903. The transmitting portion 901 may, for example, include one or more CMUTs or PMUTs. The receiving portion 903 is depicted as a single layer in this example. However, in some implementations the receiving portion 903 may include an array of discrete receiver elements.

In this example, the transmitting portion 901 is positioned at an angle $\theta_1$ relative to the overlying layer 803, which causes shear waves 714 to be transmitted in the overlying layer 803. In this example, the angle $\theta_1$ is less than a critical angle for compressional waves. Accordingly, refracted compressional waves 912 are also transmitted in the overlying layer 803. According to this example, the receiving portion 903 receives both reflected shear waves 716 and reflected compressional waves 718.

Figure 9B:
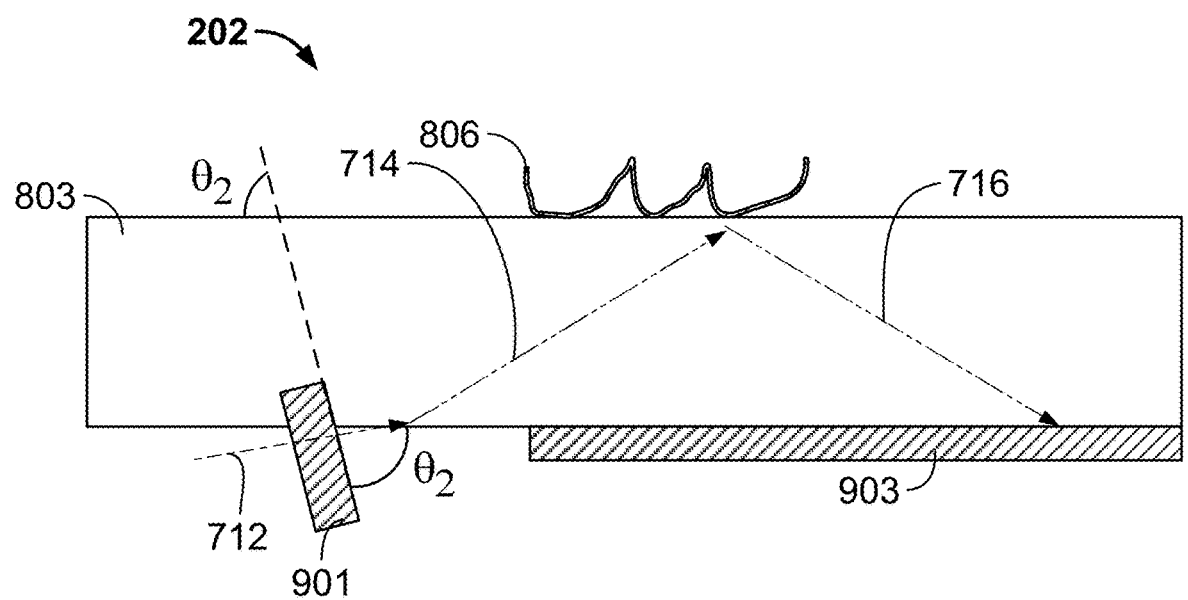
FIG. 9B shows an alternative configuration of the single element ultrasonic sensor system shown in FIG. 9A, only generating shear waves.

FIG. 9B shows an alternative configuration of the ultrasonic sensor system shown in FIG. 9A. In this example, the transmitting portion 901 is positioned at an angle $\theta_2$ relative to the overlying layer 803, which causes shear waves 714 to be transmitted in the overlying layer 803. In this example, the angle $\theta_2$ exceeds a critical angle for compressional waves. Accordingly, the receiving portion 903 receives reflected shear waves 716, but no reflected compressional waves.

According to some implementations, controlling an apparatus to transmit shear waves may involve applying a voltage to a first electrode to cause piezoelectric material having a first poling direction to transmit the shear wave. In such implementations, the piezoelectric material resides in the ultrasonic sensor system. In some such implementations, controlling the ultrasonic sensor system to transmit an ultrasonic compressional wave may involve applying a voltage to a second electrode to cause piezoelectric material having a second poling direction to transmit the first ultrasonic compressional wave.

Figures 10A, 10B:
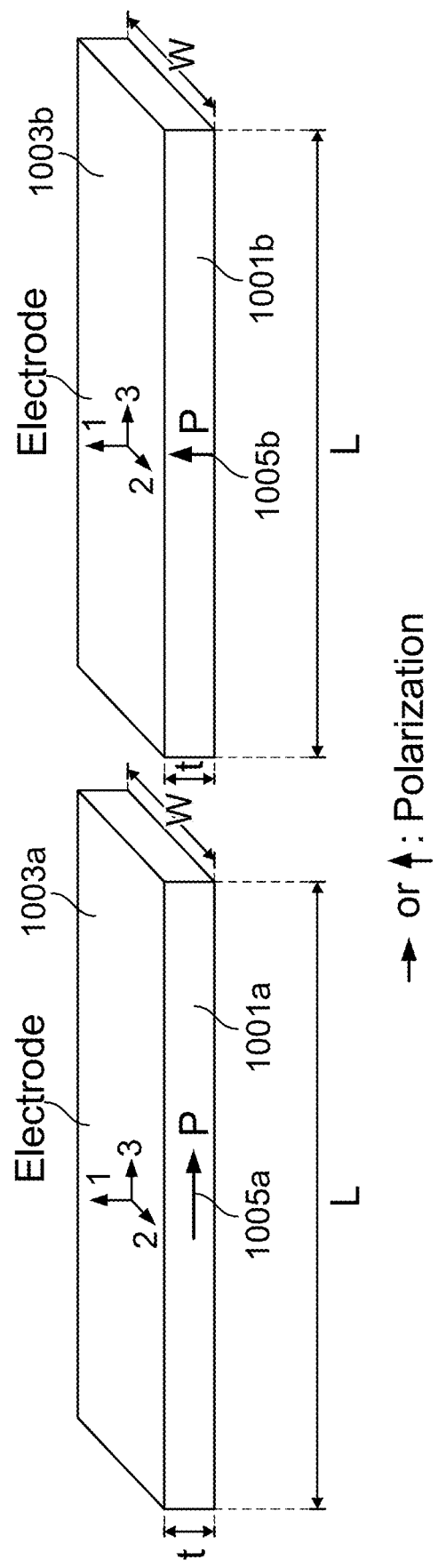
FIG. 10A shows an example of piezoelectric material having a poling direction perpendicular to the applied electric field, therefore generating shear waves
FIG. 10B shows an example of piezoelectric material having a poling direction parallel to the applied electric field, therefore generating longitudinal waves.

FIG. 10A shows an example of piezoelectric material having a poling direction. According to this example, the piezoelectric material 1001a has a thickness-shear d15 mode. In this example, the piezoelectric material 1001a has a poling direction 1005a along axis 3, which corresponds to a longitudinal axis L in this example. By applying a voltage to the top electrode 1003a with reference to a corresponding electrode on the opposing side of the piezoelectric material 1001a, a control system may cause the piezoelectric material 1001a to transmit a shear wave.

FIG. 10B shows an example of piezoelectric material having a different poling direction. In the example shown in FIG. 10B, the piezoelectric material 1001b has a thickness-normal d33 mode. In this example, the piezoelectric material 1001b has a poling direction 1005b along axis 1, which corresponds to axis t in this example. By applying a voltage to the top electrode 1003b with reference to a corresponding electrode on the opposing side of the piezoelectric material 1001b, a control system may cause the piezoelectric material 1001b to transmit a compressional wave.

Some disclosed implementations involve controlling an ultrasonic sensor system to perform a target object detection process prior to performing the authentication process. In some examples, method 300 of FIG. 3 may involve such a target object detection process.

Figure 11:
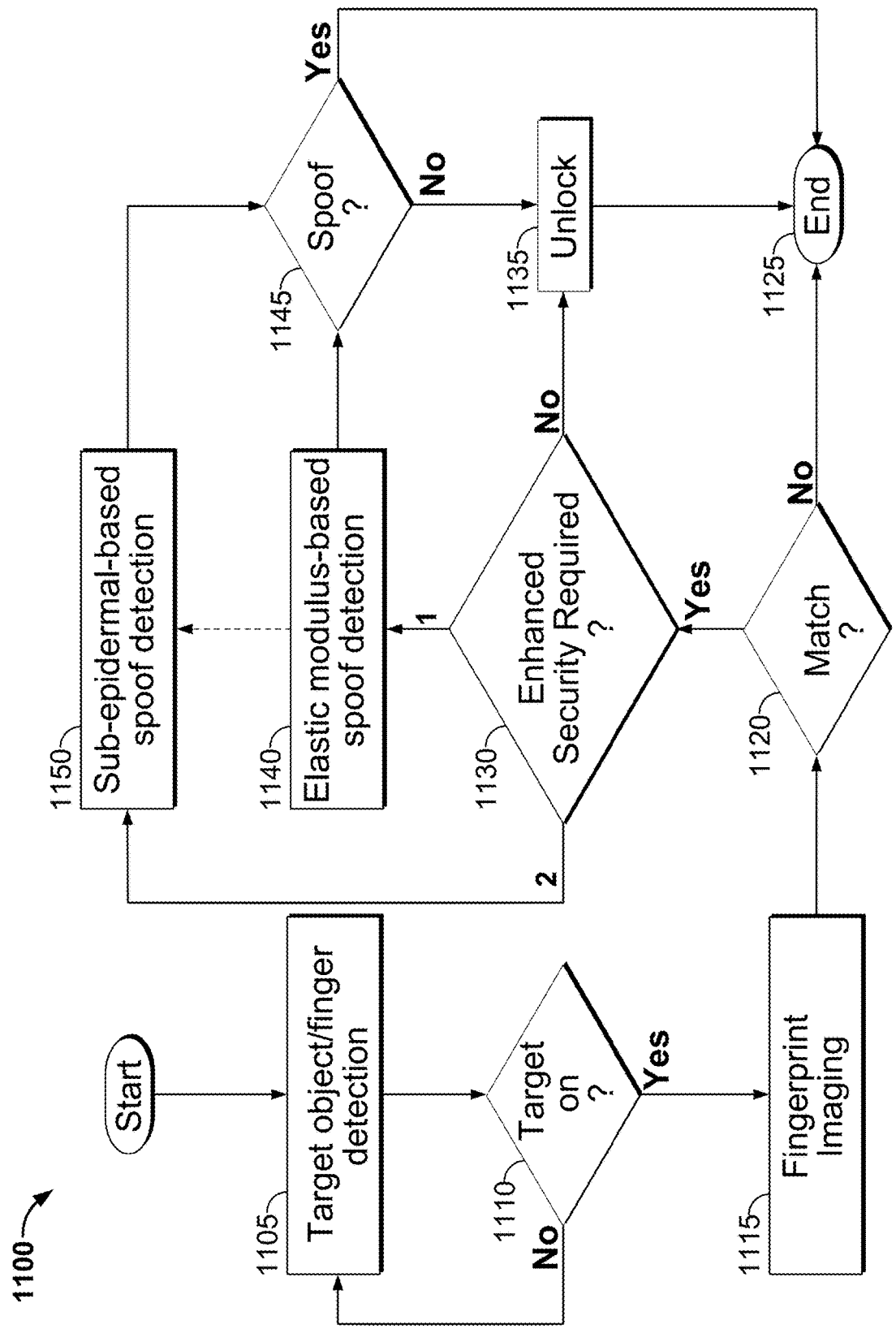
FIG. 11 is a flow diagram that provides an example of an anti-spoof method according to some implementations.

FIG. 11 is a flow diagram that provides an example of a method according to some implementations. The blocks of FIG. 11 (and those of other flow diagrams provided herein) may, for example, be performed by the apparatus 201 of FIG. 2 or by a similar apparatus. As with other methods disclosed herein, the method outlined in FIG. 11 may include more or fewer blocks than indicated. Moreover, the blocks of methods disclosed herein are not necessarily performed in the order indicated.

In this example, method 1100 is a method of controlling an apparatus that includes an ultrasonic sensor system. Method 1100 may, for example, be performed by a control system configured for electrical communication with the ultrasonic sensor system. According to this implementation, block 1105 involves a target object and/or finger detection process. According to some implementations, block 1105 may involve determining whether a target object is in the vicinity of the apparatus, e.g., according to sensor data from a touch sensor system or a gesture sensor system. In some instances, block 1105 may involve determining whether an area of the device's surface is not reflecting ultrasonic waves in a manner characteristic of an air/device boundary, but is instead absorbing ultrasonic waves in a manner consistent with a target object in contact with the device. According to some examples, block 1105 may involve determining whether a target object is an appropriate size for a digit, or a part of a digit.

If block 1105 indicates that a target object is in the vicinity of the apparatus, the process continues to block 1110 in this example. In some implementations, block 1110 may involve determining whether the target object is in contact with a region of a device configured for fingerprint imaging. In some instances, block 1110 may involve determining whether the target object is stationary for at least a predetermined period of time, such that fingerprint image data may be obtained from the target object.

If block 1110 concludes successfully, in this example the process continues to block 1115, in which fingerprint image data are obtained from the target object. As noted elsewhere herein, data received from a sensor array, such as an ultrasonic sensor array, may be referred to herein as "image data," although the image data will generally be received in the form of electrical signals. Image data that is acquired from a surface of a target object may be referred to herein as "fingerprint image data," although the image data may in some instances be obtained from a target object that is not a digit. Accordingly, without additional processing such image data would not necessarily be perceivable by a human being as an image.

In block 1120, it is determined whether the fingerprint image data, or fingerprint features extracted from the fingerprint image data, match previously-obtained fingerprint features of an authorized user of the apparatus. If not, in this example the process ends in block 1125.

However, in this example, if a match is determined in block 1120 the process continues to block 1130. According to this implementation, block 1130 involves determining whether enhanced security is required. In some examples, block 1130 may correspond with a setting of the apparatus, which may in some instances be a user-selectable setting. According to some instances, block 1130 may depend on the nature of the apparatus (e.g., whether it is particularly valuable or potentially dangerous), the confidentiality of information that may be obtained from the apparatus, etc. According to this implementation, if it is determined in block 1130 that no enhanced security is required, the process continues to block 1135 and the apparatus is unlocked.

However, in this example, if it is determined in block 1130 that enhanced security is required, the process continues to block 1140 (path 1) and/or block 1150 (path 2). Whether the process continues along path 1 or path 2 may depend on a device setting, which in some instances may be user-selectable.

According to this example, block 1140 involves an elastic modulus-based spoof detection process. According to some examples, the spoof detection process of block 1140 may involve estimating one or more target object elastic moduli and comparing the one or more target object elastic moduli with one or more digit elastic moduli. A digit elastic modulus may be a known value of an elastic modulus corresponding to a component of a human digit, such as an elastic modulus of a blood vessel, a bone, cartilage, epidermis, dermis, muscle tissue, fat tissue, a blood vessel, etc.

In some implementations, the target object elastic modulus may be a target object shear modulus and the digit elastic modulus may be a digit shear modulus. For example, the digit shear modulus may be a bone shear modulus, an epidermis shear modulus, a cartilage shear modulus, a dermis shear modulus, a muscle shear modulus and/or a fat shear modulus.

In some examples, method 1100 may proceed directly from block 1130 to 1150, whereas in other examples block 1150 may be performed in addition to block 1140. In this implementation, block 1150 involves a sub-epidermal-based spoof detection process. According to some implementations, block 1150 may involves a sub-epidermal imaging process that is based, at least in part, on shear waves. In some instances, block 1150 may involves a sub-epidermal imaging process that is based, at least in part, on compressional waves.

According to some examples the spoof detection process of block 1150 may involve extracting target object sub-epidermal image data from signals corresponding to ultrasonic shear waves and/or ultrasonic compressional waves, retrieving stored sub-epidermal image data and comparing the target object sub-epidermal image data with the stored sub-epidermal image data. Alternatively, or additionally, the spoof detection and/or authentication process of block 1150 may involve extracting target object sub-epidermal features from the second signals, retrieving stored sub-epidermal features and comparing the target object sub-epidermal features with the stored sub-epidermal features.

According to some such examples, the attribute information may include information regarding sub-epidermal features, such as information regarding features of the dermis, features of the subcutis, blood vessel features, lymph vessel features, sweat gland features and/or fat lobule features. Alternatively, or additionally, in some implementations the attribute information obtained from the received image data and the stored attribute information may include information regarding bone tissue features, muscle tissue features and/or epidermal or sub-epidermal tissue features.

Similarly, biometric template data corresponding to sub-epidermal features may include information regarding the attributes of blood vessels, such as information regarding the types and locations of blood vessel features, such as blood vessel size, blood vessel orientation, the locations of blood vessel branch points, etc. Alternatively, or additionally, biometric template data corresponding to sub-epidermal features may include attribute information regarding the types (e.g., the sizes, shapes, orientations, etc.) and locations of features of the dermis, features of the subcutis, lymph vessel features, sweat gland features, hair follicle features, hair papilla features, fat lobule features, muscle tissue and/or bone material.

In the example shown in FIG. 11, block 1145 involves determining, based on input from block 1140 and/or block 1150, whether the target object is a spoof. If it is determined in block 1145 that the target object is a spoof, the process continues to block 1125 in this example. However, in this example, if it is determined in block 1145 that the target object is not a spoof, the process continues to block 1135 and the apparatus is unlocked.

Figure 12:
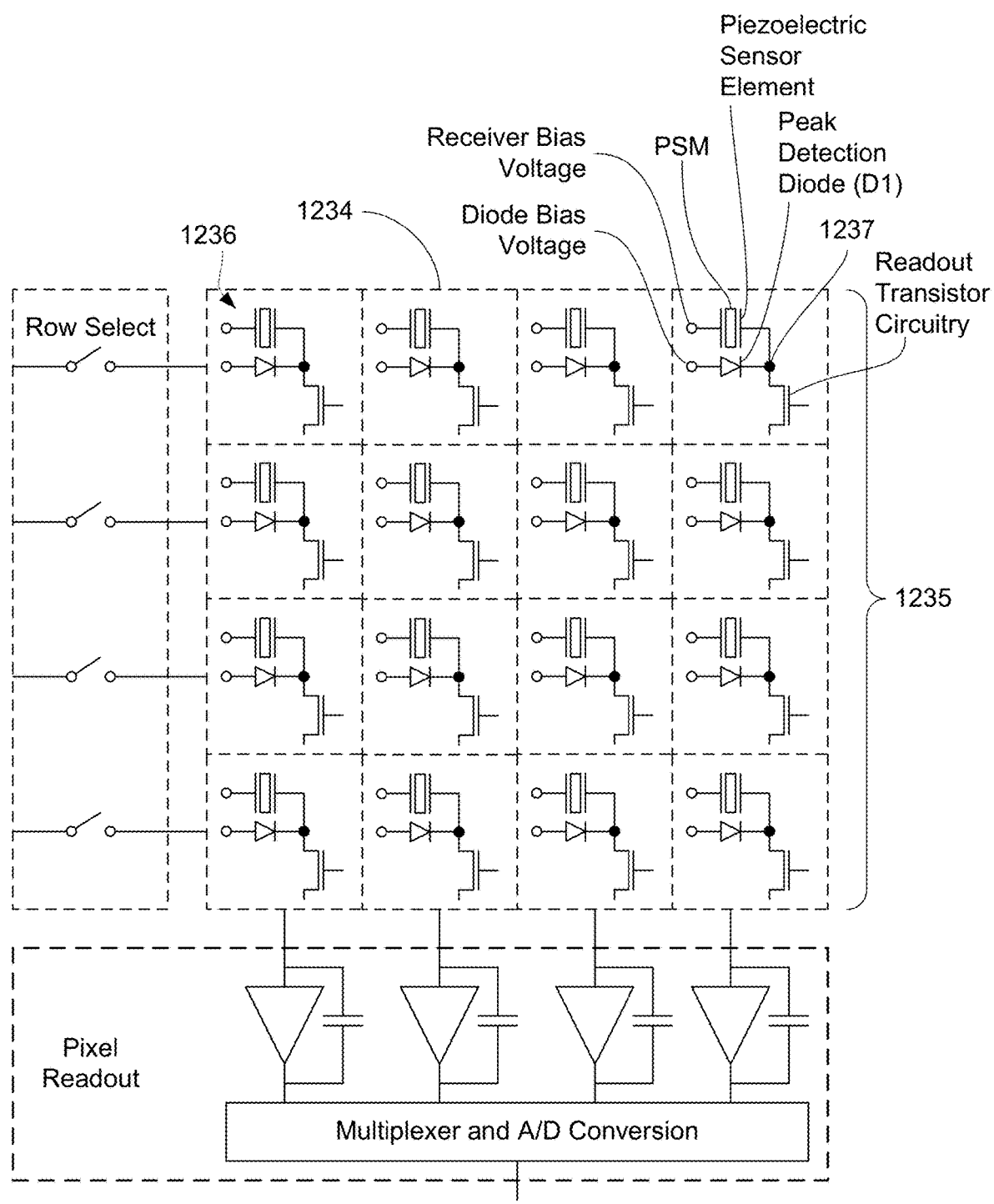
FIG. 12 representationally depicts aspects of a 4×4 pixel array of sensor pixels for an ultrasonic sensor system.

FIG. 12 representationally depicts aspects of a 4×4 pixel array of sensor pixels for an ultrasonic sensor system. Each pixel 1234 may be, for example, associated with a local region of piezoelectric sensor material (PSM), a peak detection diode (D1) and a readout transistor (M3); many or all of these elements may be formed on or in a substrate to form the pixel circuit 1236. In practice, the local region of piezoelectric sensor material of each pixel 1234 may transduce received ultrasonic energy into electrical charges. The peak detection diode D1 may register the maximum amount of charge detected by the local region of piezoelectric sensor material PSM. Each row of the pixel array 1235 may then be scanned, e.g., through a row select mechanism, a gate driver, or a shift register, and the readout transistor M3 for each column may be triggered to allow the magnitude of the peak charge for each pixel 1234 to be read by additional circuitry, e.g., a multiplexer and an A/D converter. The pixel circuit 1236 may include one or more TFTs to allow gating, addressing, and resetting of the pixel 1234.

Each pixel circuit 1236 may provide information about a small portion of the object detected by the ultrasonic sensor system. While, for convenience of illustration, the example shown in FIG. 12 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the target object.

Figure 13A:
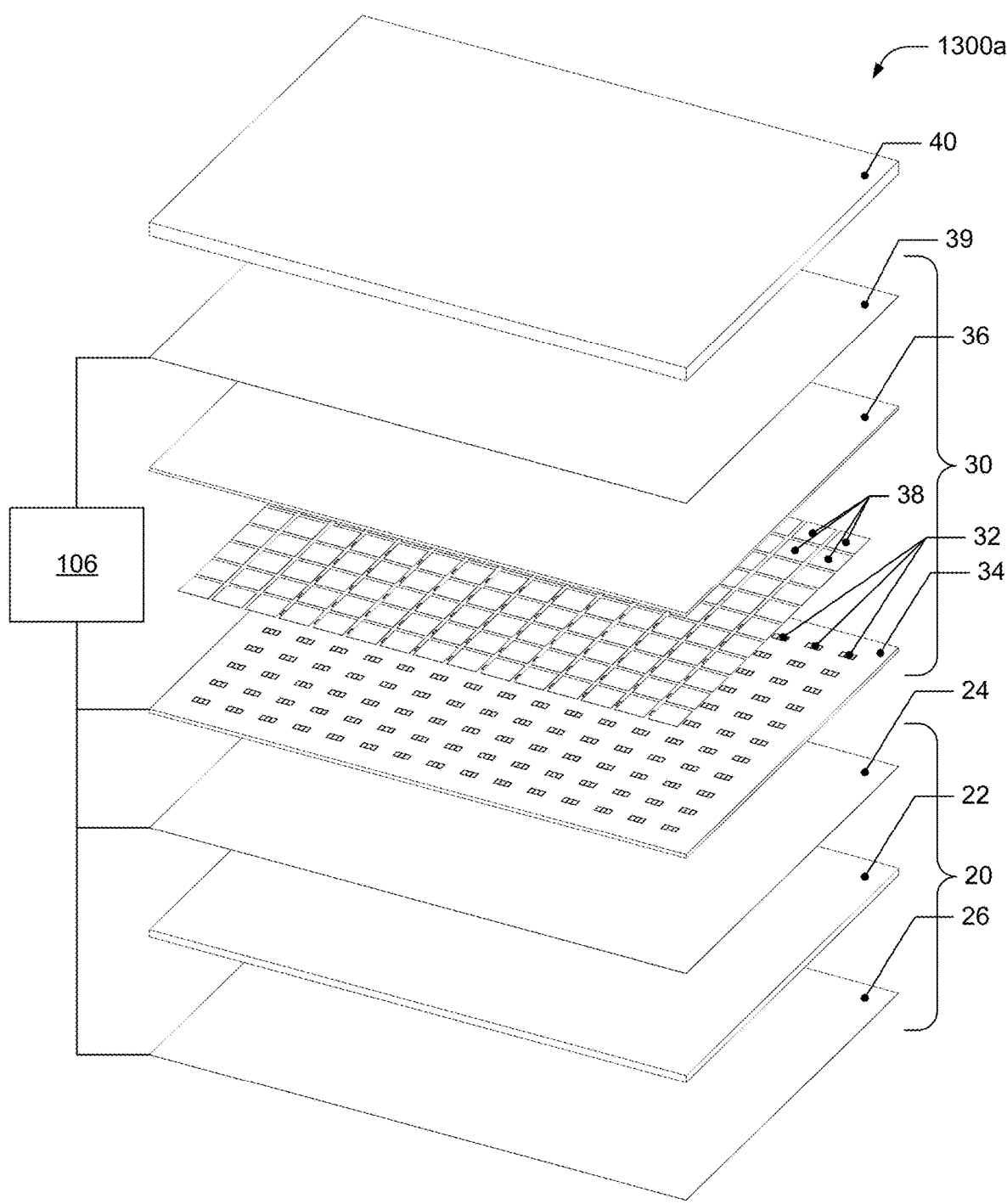
FIGS. 13A and 13B show example arrangements of ultrasonic transmitters and receivers in an ultrasonic sensor system, with other arrangements being possible.

FIG. 13A shows an example of an exploded view of an ultrasonic sensor system. In this example, the ultrasonic sensor system 1300a includes an ultrasonic transmitter 20 and an ultrasonic receiver 30 under a platen 40. According to some implementations, the ultrasonic receiver 30 may be an example of the ultrasonic sensor system 202 that is shown in FIG. 2 and described above. In some implementations, the ultrasonic transmitter 20 may be an example of the optional ultrasonic transmitter that is shown in FIG. 2 and described above. The ultrasonic transmitter 20 may include a substantially planar piezoelectric transmitter layer 22 and may be capable of functioning as a plane wave generator. Ultrasonic waves may be generated by applying a voltage to the piezoelectric layer to expand or contract the layer, depending upon the signal applied, thereby generating a plane wave. In this example, the control system 206 may be capable of causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This ultrasonic wave may travel towards a finger (or other object to be detected), passing through the platen 40. A portion of the wave not absorbed or transmitted by the object to be detected may be reflected so as to pass back through the platen 40 and be received by at least a portion of the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT elements, electrical interconnect traces and, in some implementations, one or more additional circuit elements such as diodes, capacitors, and the like. Each sensor pixel circuit 32 may be configured to convert an electric charge generated in the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into localized electrical charges by the piezoelectric receiver layer 36. These localized charges may be collected by the pixel input electrodes 38 and passed on to the underlying sensor pixel circuits 32. The charges may be amplified or buffered by the sensor pixel circuits 32 and provided to the control system 206.

The control system 206 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 206 may operate substantially as described above. For example, the control system 206 may be capable of processing the amplified signals received from the sensor pixel circuits 32.

The control system 206 may be capable of controlling the ultrasonic transmitter 20 and/or the ultrasonic receiver 30 to obtain ultrasonic image data, e.g., by obtaining fingerprint images. Whether or not the ultrasonic sensor system 1300a includes an ultrasonic transmitter 20, the control system 206 may be capable of obtaining attribute information from the ultrasonic image data. In some examples, the control system 206 may be capable of controlling access to one or more devices based, at least in part, on the attribute information. The ultrasonic sensor system 1300a (or an associated device) may include a memory system that includes one or more memory devices. In some implementations, the control system 206 may include at least a portion of the memory system. The control system 206 may be capable of obtaining attribute information from ultrasonic image data and storing the attribute information in the memory system. In some implementations, the control system 206 may be capable of capturing a fingerprint image, obtaining attribute information from the fingerprint image and storing attribute information obtained from the fingerprint image (which may be referred to herein as fingerprint image information) in the memory system. According to some examples, the control system 206 may be capable of capturing a fingerprint image, obtaining attribute information from the fingerprint image and storing attribute information obtained from the fingerprint image even while maintaining the ultrasonic transmitter 20 in an "off" state.

In some implementations, the control system 206 may be capable of operating the ultrasonic sensor system 1300a in an ultrasonic imaging mode or a force-sensing mode. In some implementations, the control system may be capable of maintaining the ultrasonic transmitter 20 in an "off" state when operating the ultrasonic sensor system in a force-sensing mode. The ultrasonic receiver 30 may be capable of functioning as a force sensor when the ultrasonic sensor system 1300a is operating in the force-sensing mode. In some implementations, the control system 206 may be capable of controlling other devices, such as a display system, a communication system, etc. In some implementations, the control system 206 may be capable of operating the ultrasonic sensor system 1300a in a capacitive imaging mode.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is capable of imaging fingerprints in a force detection mode or a capacitance detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF planar piezoelectric transmitter layer 22 is approximately 28 µm thick and a PVDF-TrFE receiver layer 36 is approximately 12 µm thick. Example frequencies of the ultrasonic waves may be in the range of 5 MHz to 30 MHz, with wavelengths on the order of a millimeter or less.

Figure 13B:
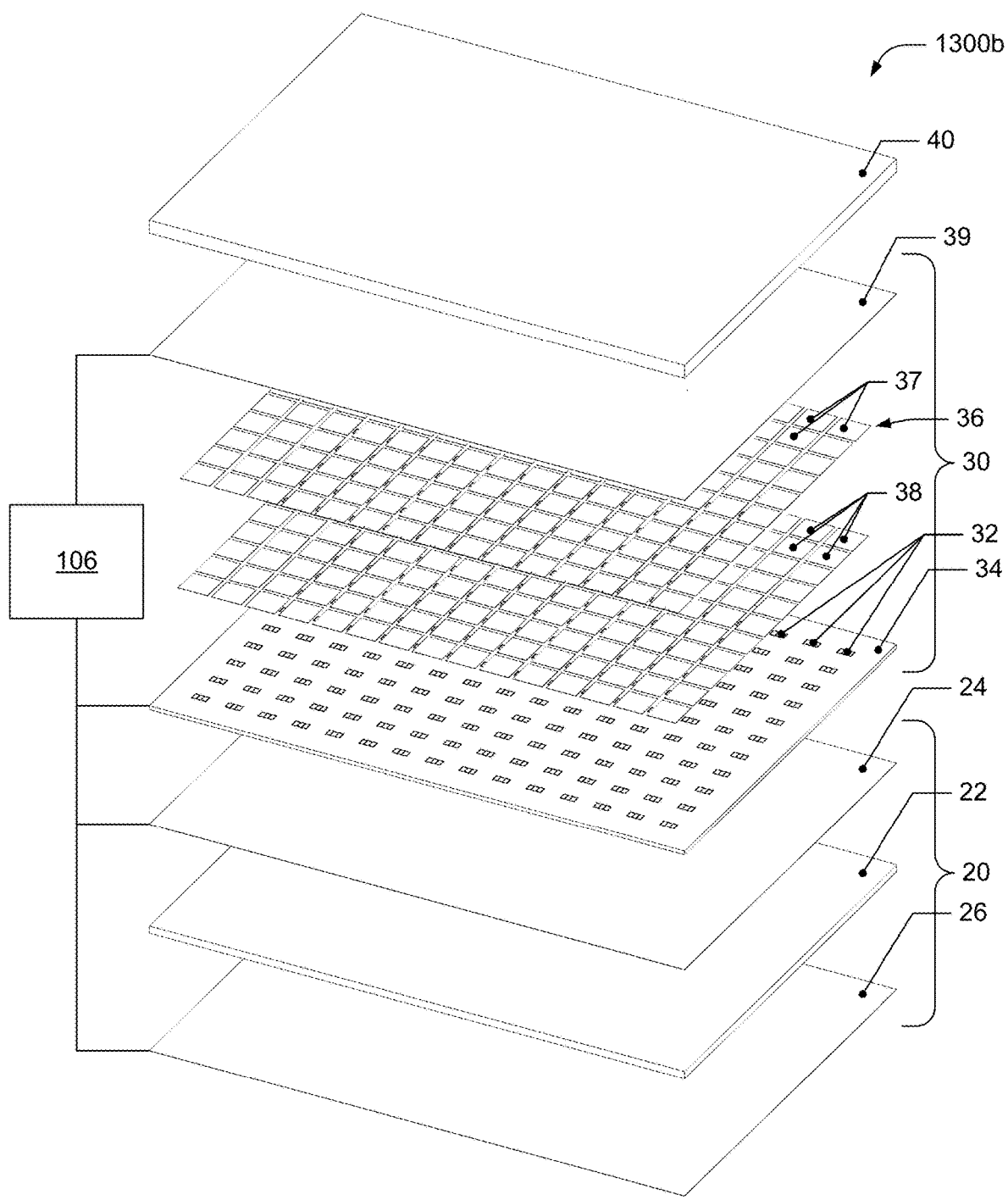

FIG. 13B shows an exploded view of an alternative example of an ultrasonic sensor system. In this example, the piezoelectric receiver layer 36 has been formed into discrete elements 37. In the implementation shown in FIG. 13B, each of the discrete elements 37 corresponds with a single pixel input electrode 38 and a single sensor pixel circuit 32. However, in alternative implementations of the ultrasonic sensor system 1300b, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 13A and 13B show example arrangements of ultrasonic transmitters and receivers in an ultrasonic sensor system, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor array (e.g., a single-layer transmitter and receiver). In some implementations, the ultrasonic sensor system may include an acoustic delay layer. For example, an acoustic delay layer may be incorporated into the ultrasonic sensor system between the ultrasonic transmitter 20 and the ultrasonic receiver 30. An acoustic delay layer may be employed to adjust the ultrasonic pulse timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic sensor system is arriving at the ultrasonic receiver 30. In some implementations, the substrate 34 and/or the platen 40 may serve as an acoustic delay layer.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus, comprising:
   an ultrasonic sensor system; and
   a control system, the control system configured for:
   controlling the ultrasonic sensor system to transmit a first ultrasonic compressional wave;
   receiving first signals from the ultrasonic sensor system, the first signals including signals corresponding to reflections of the first ultrasonic compressional wave from a target object proximate a surface of the apparatus;
   performing an authentication process based, at least in part, on the first signals;
   controlling the apparatus to transmit a shear wave;
   receiving second signals from the ultrasonic sensor system, the second signals including signals corresponding to reflections of the shear wave from the target object; and
   performing a spoof detection process based, at least in part, on the second signals.

2. The apparatus of claim 1, wherein the spoof detection process involves:
   estimating a target object elastic modulus; and
   comparing the target object elastic modulus with a digit elastic modulus.

3. The apparatus of claim 2, wherein the target object elastic modulus comprises a target object shear modulus and the digit elastic modulus comprises a digit shear modulus.

4. The apparatus of claim 3, wherein the digit shear modulus comprises one or more shear moduli from a list of shear moduli consisting of a bone shear modulus, an epidermis shear modulus, a cartilage shear modulus, a dermis shear modulus, a muscle shear modulus and a fat shear modulus.

5. The apparatus of claim 1, wherein the spoof detection process involves:
   extracting target object sub-epidermal features from the second signals;
   retrieving stored sub-epidermal features; and
   comparing the target object sub-epidermal features with the stored sub-epidermal features.

6. The apparatus of claim 1, wherein the spoof detection process involves:
   extracting target object sub-epidermal image data from the second signals;
   retrieving stored sub-epidermal image data; and
   comparing the target object sub-epidermal image data with the stored sub-epidermal image data.

7. The apparatus of claim 1, further comprising a haptic feedback device, wherein controlling the apparatus to transmit the shear wave involves activating the haptic feedback device.

8. The apparatus of claim 1, wherein controlling the apparatus to transmit the shear wave involves causing the shear wave to be generated by the first ultrasonic compressional wave.

9. The apparatus of claim 8, wherein causing the shear wave to be generated by the first ultrasonic compressional wave involves controlling the ultrasonic sensor system to transmit the first ultrasonic compressional wave at an angle relative to the surface of the apparatus.

10. The apparatus of claim 8, further comprising a layer with embedded reflectors configured to produce the shear wave in response to the first ultrasonic compressional wave, wherein causing the shear wave to be generated by the first ultrasonic compressional wave involves controlling the ultrasonic sensor system to transmit the first ultrasonic compressional wave into the layer.

11. The apparatus of claim 8, wherein causing the shear wave to be generated by the first ultrasonic compressional wave involves controlling the ultrasonic sensor system to focus the first ultrasonic compressional wave.

12. The apparatus of claim 8, wherein causing the shear wave to be generated by the first ultrasonic compressional wave involves controlling the ultrasonic sensor system to perform a beamforming and/or beam steering process that involves the first ultrasonic compressional wave.

13. The apparatus of claim 1, wherein controlling the apparatus to transmit the shear wave involves applying an electric field perpendicular to a poling direction of the piezoelectric material to transmit the shear wave.

14. The apparatus of claim 13, wherein controlling the ultrasonic sensor system to transmit the first ultrasonic compressional wave involves applying an electric field parallel to the polling direction of the piezoelectric material to transmit the first ultrasonic compressional wave.

15. The apparatus of claim 1, wherein the control system is further configured for controlling the ultrasonic sensor system to perform a target object detection process prior to performing the authentication process.

16. A method of controlling an apparatus that includes an ultrasonic sensor system, the method comprising:
controlling, via a control system, the ultrasonic sensor system to transmit a first ultrasonic compressional wave;
receiving, by the control system, first signals from the ultrasonic sensor system, the first signals including signals corresponding to reflections of the first ultrasonic compressional wave from a target object proximate a surface of the apparatus;
performing, by the control system, an authentication process based, at least in part, on the first signals;
controlling, via the control system, the apparatus to transmit a shear wave;
receiving, by the control system, second signals from the ultrasonic sensor system, the second signals including signals corresponding to reflections of the shear wave from the target object; and
performing, by the control system, a spoof detection process based, at least in part, on the second signals.

17. The method of claim 16, wherein the spoof detection process involves:
estimating a target object elastic modulus; and
comparing the target object elastic modulus with a digit elastic modulus.

18. The method of claim 17, wherein the target object elastic modulus comprises a target object shear modulus and the digit elastic modulus comprises a digit shear modulus.

19. The method of claim 18, wherein the digit shear modulus comprises one or more shear moduli from a list of shear moduli consisting of a bone shear modulus, an epidermis shear modulus, a cartilage shear modulus, a dermis shear modulus, a muscle shear modulus and a fat shear modulus.

20. The method of claim 16, wherein the spoof detection process involves:
extracting target object sub-epidermal features from the second signals;
retrieving stored sub-epidermal features; and
comparing the target object sub-epidermal features with the stored sub-epidermal features.

21. The method of claim 16, wherein the spoof detection process involves:
extracting target object sub-epidermal image data from the second signals;
retrieving stored sub-epidermal image data; and
comparing the target object sub-epidermal image data with the stored sub-epidermal image data.

22. The method of claim 16, wherein controlling the apparatus to transmit the shear wave involves causing the shear wave to be generated by the first ultrasonic compressional wave.

23. The method of claim 16, wherein controlling the method to transmit the shear wave involves applying an electric field perpendicular to a poling direction of the piezoelectric material to transmit the shear wave.

24. The method of claim 23, wherein controlling the ultrasonic sensor system to transmit the first ultrasonic compressional wave involves applying an electric field parallel to the poling direction of the piezoelectric material to transmit the first ultrasonic compressional wave.

25. One or more non-transitory media having software stored thereon, the software including instructions for controlling one of more devices to perform a method, the method comprising:
controlling, via a control system configured for electrical communication with the ultrasonic sensor system, the ultrasonic sensor system to transmit a first ultrasonic compressional wave;
receiving, by the control system, first signals from the ultrasonic sensor system, the first signals including signals corresponding to reflections of the first ultrasonic compressional wave from a target object proximate a surface of the one or more devices;
performing, by the control system, an authentication process based, at least in part, on the first signals;
controlling, via the control system, the apparatus to transmit a shear wave;
receiving, by the control system, second signals from the ultrasonic sensor system, the second signals including signals corresponding to reflections of the shear wave from the target object; and
performing, by the control system, a spoof detection process based, at least in part, on the second signals.

26. The one or more non-transitory media of claim 25, wherein the spoof detection process involves:
estimating a target object shear modulus; and
comparing the target object shear modulus with a digit shear modulus.

27. The one or more non-transitory media of claim 25, wherein the spoof detection process involves:
extracting target object sub-epidermal image data from the second signals;
retrieving stored sub-epidermal image data; and
comparing the target object sub-epidermal image data with the stored sub-epidermal image data.

28. An apparatus, comprising:
an ultrasonic sensor system; and
control means for:
controlling the ultrasonic sensor system to transmit a first ultrasonic compressional wave;
receiving first signals from the ultrasonic sensor system, the first signals including signals corresponding to reflections of the first ultrasonic compressional wave from a target object proximate a surface of the apparatus;
performing an authentication process based, at least in part, on the first signals;
controlling the apparatus to transmit a shear wave;
receiving second signals from the ultrasonic sensor system, the second signals including signals corresponding to reflections of the shear wave from the target object; and
performing a spoof detection process based, at least in part, on the second signals.

29. The apparatus of claim 28, wherein the spoof detection process involves:
estimating a target object shear modulus; and
comparing the target object shear modulus with a digit shear modulus.

30. The apparatus of claim 28, wherein the spoof detection process involves:

extracting target object sub-epidermal image data from the second signals;
retrieving stored sub-epidermal image data; and
comparing the target object sub-epidermal image data with the stored sub-epidermal image data.

* * * * *